United States Patent
Chliwnyj et al.

(10) Patent No.: US 6,831,805 B2
(45) Date of Patent: Dec. 14, 2004

(54) APPARATUS AND METHOD TO READ AND/OR WRITE INFORMATION TO A MAGNETIC TAPE MEDIUM

(75) Inventors: Alex Chliwnyj, Tucson, AZ (US); David L. Swanson, Tucson, AZ (US); Steven C. Wills, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 10/185,234

(22) Filed: Jun. 27, 2002

(65) Prior Publication Data

US 2004/0001275 A1 Jan. 1, 2004

(51) Int. Cl.[7] ............................................. G11B 5/584
(52) U.S. Cl. .................................................. 360/77.12
(58) Field of Search ............................. 360/77.12, 75, 360/78.02

(56) References Cited

U.S. PATENT DOCUMENTS

| | | | |
|---|---|---|---|
| 3,593,097 A | 7/1971 | Gebelein, Jr. | |
| 4,616,276 A | 10/1986 | Workman | 360/77 |
| 5,053,897 A | 10/1991 | Ikeshita | |
| 5,055,951 A * | 10/1991 | Behr | 360/77.12 |
| 5,394,277 A * | 2/1995 | Pahr et al. | 360/77.12 |
| 5,483,394 A * | 1/1996 | Harman | 360/77.12 |
| 5,548,192 A | 8/1996 | Hanks | 318/560 |
| 5,574,602 A | 11/1996 | Baca et al. | 360/77.12 |
| 5,717,538 A | 2/1998 | Cheung et al. | |
| 5,815,337 A | 9/1998 | Milo | |
| 5,815,338 A | 9/1998 | Tsunckawa et al. | |
| 5,828,514 A * | 10/1998 | Chliwnyj et al. | 360/77.12 |
| 5,867,353 A | 2/1999 | Valent | |
| 5,946,156 A * | 8/1999 | Schwarz et al. | 360/75 |
| 5,946,159 A | 8/1999 | Chliwnyj et al. | 360/77.12 |
| 6,031,671 A * | 2/2000 | Ayres | 360/77.12 |
| 6,046,879 A | 4/2000 | Hampshire | 360/77.08 |
| 6,078,463 A * | 6/2000 | Pahr | 360/77.12 |
| 6,108,159 A * | 8/2000 | Nute et al. | 360/77.12 |
| 6,175,472 B1 | 1/2001 | Valent | |
| 6,288,864 B1 | 9/2001 | Widener et al. | |
| 6,330,123 B1 * | 12/2001 | Schwarz et al. | 360/77.12 |
| 6,462,899 B1 * | 10/2002 | Chliwnyj et al. | 360/77.12 |
| 6,525,898 B1 * | 2/2003 | Chliwnyj et al. | 360/77.12 |
| 6,690,535 B2 * | 2/2004 | Wang | 360/77.12 |

FOREIGN PATENT DOCUMENTS

| | | |
|---|---|---|
| JP | 10208418 A | 8/1998 |
| WO | WO 97/43758 | 11/1997 |

* cited by examiner

Primary Examiner—Sinh Tran
Assistant Examiner—James L. Habermehl
(74) Attorney, Agent, or Firm—Dale F. Regelman

(57) ABSTRACT

An apparatus and method to read and/or write information from and/or to a moving magnetic tape comprising one or more servo edges using a tape head comprising (N) servo sensors. Bach servo edge comprises an interface between a first recorded signal and a second recorded signal, where each of the (N) servo sensors detects that first recorded signal and that second recorded signal. The method calculates (N) target PES signals and provides (N) measured PES signals. Using the target and the measured PES signals, the method forms (N) weighted PES signals and averages those (N) weighted PES signals to form a Composite PES signal. That Composite PES signal is used to position the tape head.

44 Claims, 11 Drawing Sheets

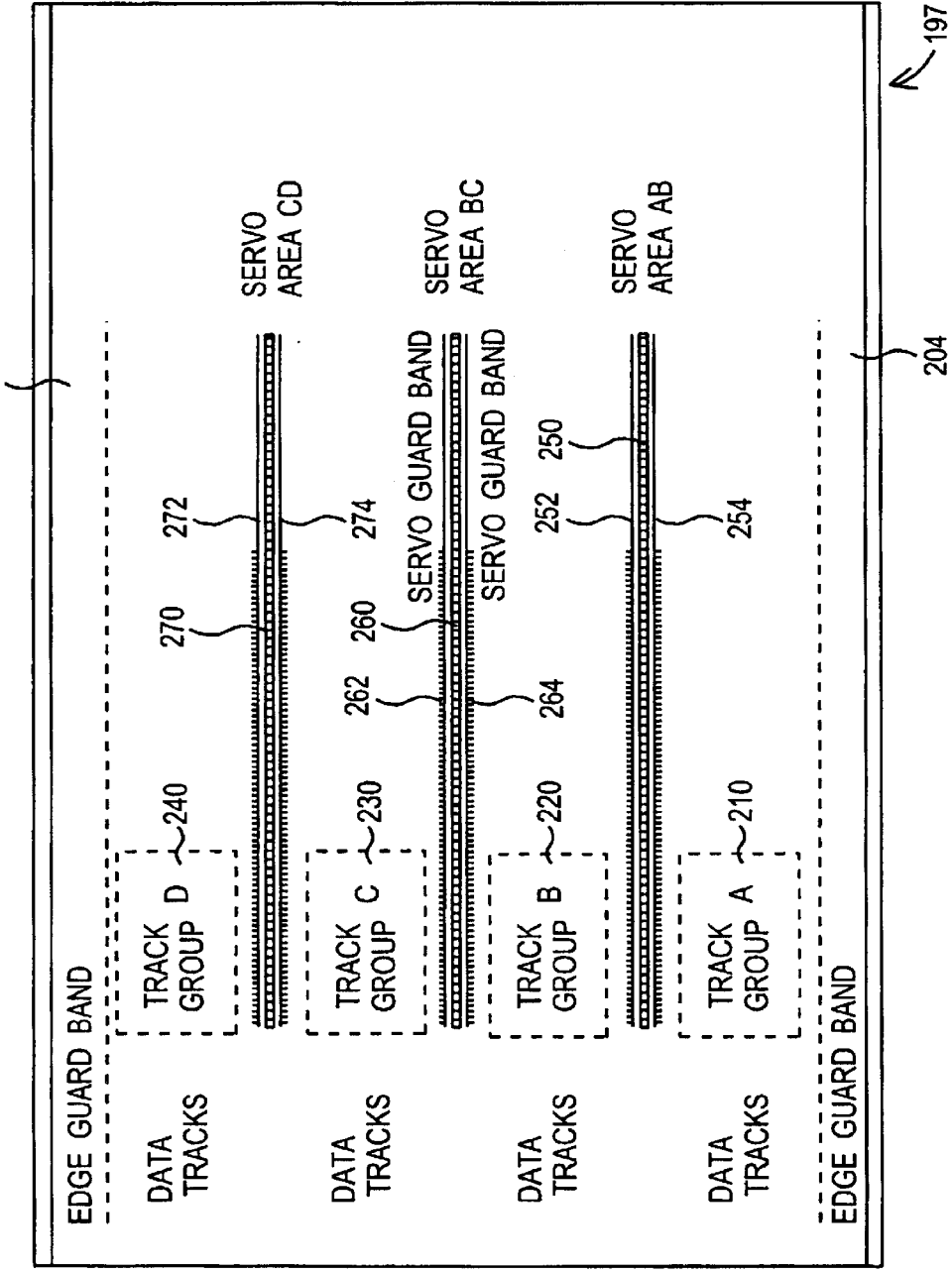

FIG. 2B

| HEAD TRACK NO. | HEAD MODULE L | HEAD MODULE R | |
|---|---|---|---|
| 1 | WR | RD | |
| 2 | RD | WR | |
| 3 | WR | RD | |
| 4 | RD | WR | |
| 5 | WR | RD | |
| 6 | RD | WR | |
| 7 | WR | RD | |
| 8 | RD | WR | —272 |
| SERVO | LS1 | RS1 | —274 |
| SERVO | LS2 | RS2 | —278 } 275 |
| 9 | WR | RD | —276 |
| 10 | RD | WR | |
| 11 | WR | RD | |
| 12 | RD | WR | |
| 13 | WR | RD | |
| 14 | RD | WR | |
| 15 | WR | RD | |
| 16 | RD | WR | —262 |
| SERVO | LS3 | RS3 | —264 |
| SERVO | LS4 | RS4 | —268 } 265 |
| 17 | WR | RD | —266 |
| 18 | RD | WR | |
| 19 | WR | RD | |
| 20 | RD | WR | |
| 21 | WR | RD | |
| 22 | RD | WR | |
| 23 | WR | RD | |
| 24 | RD | WR | —252 |
| SERVO | LS5 | RS5 | —254 |
| SERVO | LS6 | RS6 | —258 } 255 |
| 25 | WR | RD | —256 |
| 26 | RD | WR | |
| 27 | WR | RD | |
| 28 | RD | WR | |
| 29 | WR | RD | |
| 30 | RD | WR | |
| 31 | WR | RD | |
| 32 | RD | WR | |

APPARATUS AND METHOD TO READ AND/ OR WRITE INFORMATION TO A MAGNETIC TAPE MEDIUM

FIELD OF THE INVENTION

This invention relates to an apparatus and method to read and/or write information to a magnetic tape. In certain embodiments, this invention relates to servo track following a moving magnetic tape having one or more servo edges of dissimilar recorded servo signals.

BACKGROUND OF THE INVENTION

Automated media storage libraries are known for providing cost effective access to large quantities of stored media. Tape cartridges containing a moveable magnetic tape are often used in automated data storage libraries. Tape media, such a magnetic tape, is a common medium for the storage of data to be utilized by a computer. Magnetic tape has found widespread use as a data storage medium because it provides a relatively inexpensive solution for storing large amounts of data.

Magnetic tape data storage typically provides one or more prerecorded servo tracks to allow precise positioning of a tape head with respect to those prerecorded servo tracks. Servo sensors disposed on the tape head are used to track the recorded servo tracks. The tape head comprises one or more read/write elements precisely positioned with respect to those servo sensors. One example of a magnetic tape system is the IBM 3590, which employs magnetic tape having prerecorded servo patterns that include three parallel sets of servo edges, each servo edge being an interface between two dissimilar recorded servo signals, each set of servo edges comprising one servo edge on each of opposite lateral sides of a middle recorded servo signal.

In certain embodiments, the tape head includes a plurality of servo sensors for each servo edge, with the result that the tape head may be stepped between those servo sensors, each positioning the read/write elements at different interleaved groups of data tracks. Typically, for a given servo pattern of a set of two servo edges, the outer servo signals are recorded first, and the center servo signal is recorded last, to provide the servo edges. The nominal separation distance between the servo edges of each set of servo edges is a certain distance, but there is variation in the magnetic separation between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation distance of the prerecorded servo tracks from nominal, the prerecording of the servo tracks is conducted at different amplitudes so as to attempt to compensate for the physical difference and provide a magnetic pattern that is closer to nominal. Thus, the difference in physical distance and the amplitude compensation may tend to offset each other with respect to the apparent distance between the servo tracks. These actions may provide an adequate signal for track following at the servo edges.

However, to increase track density, a servo sensor may be indexed to positions laterally offset from the linear servo edges to provide further interleaved groups of data tracks. The indexed positions are determined by measuring the ratio between the amplitudes of the two dissimilar recorded servo signals. Thus, when the amplitudes of the recorded servo signals are varied to compensate for physical distance variations, track following the prerecorded servo edges at the offset indexed positions becomes less precise. As the result, the data tracks may vary from the desired positions, i.e. be "squeezed" together, such that writing on one track with a write element that is subject to track misregistration (TMR) may cause a data error on the immediately adjacent data track.

The tape path of the above IBM 3590 is a guided tape path. In such a guided tape path embodiment, the magnetic tape can be moved in a first direction and an opposing second direction along a first axis, i.e. along the longitudinal axis of the tape. Movement of that tape along a second axis orthogonal to the first axis, i.e. the lateral axis of the tape, is minimized. Limiting the lateral movement of the magnetic tape results in generating minimal guiding noise, and therefore, the step from a first ratio of servo signals to a second ratio is readily discernible.

Another approach, however, is required for open channel guiding in which the magnetic tape can move laterally a distance which is substantially greater than the separation between index positions, thereby introducing substantial noise into the guiding process. The guiding signal to noise ratio thus becomes negative, with the guiding noise being far larger than the step from one ratio to another, making it difficult to gather data points with a monotonic slope to conduct a calibration of the servo ratios.

SUMMARY OF THE INVENTION

Applicants' invention includes an apparatus and method to read and/or write information from and/or to a moving magnetic tape using a tape head disposed adjacent said magnetic tape, where that tape head includes (N) servo sensors and where that magnetic tape includes (N) servo edges to be read concurrently. Each such servo edge comprising an interface between a first recorded signal and a second recorded signal, where each of the (N) servo sensors detects the first recorded signal and the second recorded signal. Applicants' method first calculates (N) target PES signals, where the (i)th target PES signal is determined for the (i)th servo sensor. Applicants' method then provides (N) measured PES signals during a read/write operation, where the (i)th servo sensor provides the (i)th measured PES signal. Applicants' method then determines deviation $D_i$, where $D_i$ comprises the absolute magnitude of the difference between the (i)th measured PES signal and the (i)th target PES signal. Applicants' method then assigns a weight factor $WF_i$ for the (i)th measured PES signal, where $WF_i$ is inversely related to $D_i$.

Applicants' method then forms (N) weighted PES signals, where the (i)th weighted PES signal is formed by multiplying the (i)th weight factor times the (i)th measured PES signal. Applicants' method then uses those (N) weighted PES signals to form a Composite PES signal. That Composite PES signal is used to position the tape head during the read/write operation.

Applicants' invention further includes an article of manufacture comprising a computer useable medium having computer readable program code disposed therein for reading and/or writing information from and/or to a moving magnetic tape using a tape head disposed adjacent that magnetic tape, where that tape head includes (N) servo sensors and where that magnetic tape includes (N) servo edges, each servo edge comprising an interface between a first recorded signal and a second recorded signal, where each of said (N) servo sensors detects the first recorded signal and the second recorded signal.

Applicants' invention further includes a computer program product usable with a programmable computer processor having computer readable program code embodied therein for reading and/or writing information from and/or to a moving magnetic tape using a tape head disposed adjacent that magnetic tape, where the tape head includes (N) servo sensors and where the magnetic tape includes (N) servo edges, each servo edge comprising an interface between a first recorded signal and a second recorded signal, where each of the (N) servo sensors detects the first recorded signal and the second recorded signal.

BRIEF DESCRIPTION OF THE DRAWINGS

The invention will be better understood from a reading of the following detailed description taken in conjunction with the drawings in which like reference designators are used to designate like elements, and in which:

FIG. 2A is a diagrammatic illustration of a magnetic tape having three parallel sets of linear servo edges, each servo edge comprising an interface between two dissimilar recorded servo signals;

FIG. 2B is a block diagram showing one embodiment of a magnetic tape head;

DETAILED DESCRIPTION OF THE PREFERRED EMBODIMENTS

This invention is described in preferred embodiments in the following description with reference to the Figures, in which like numbers represent the same or similar elements. The invention will be described as embodied in an apparatus and method to read and/or write information from and/or to a moving magnetic tape.

Figure 1:
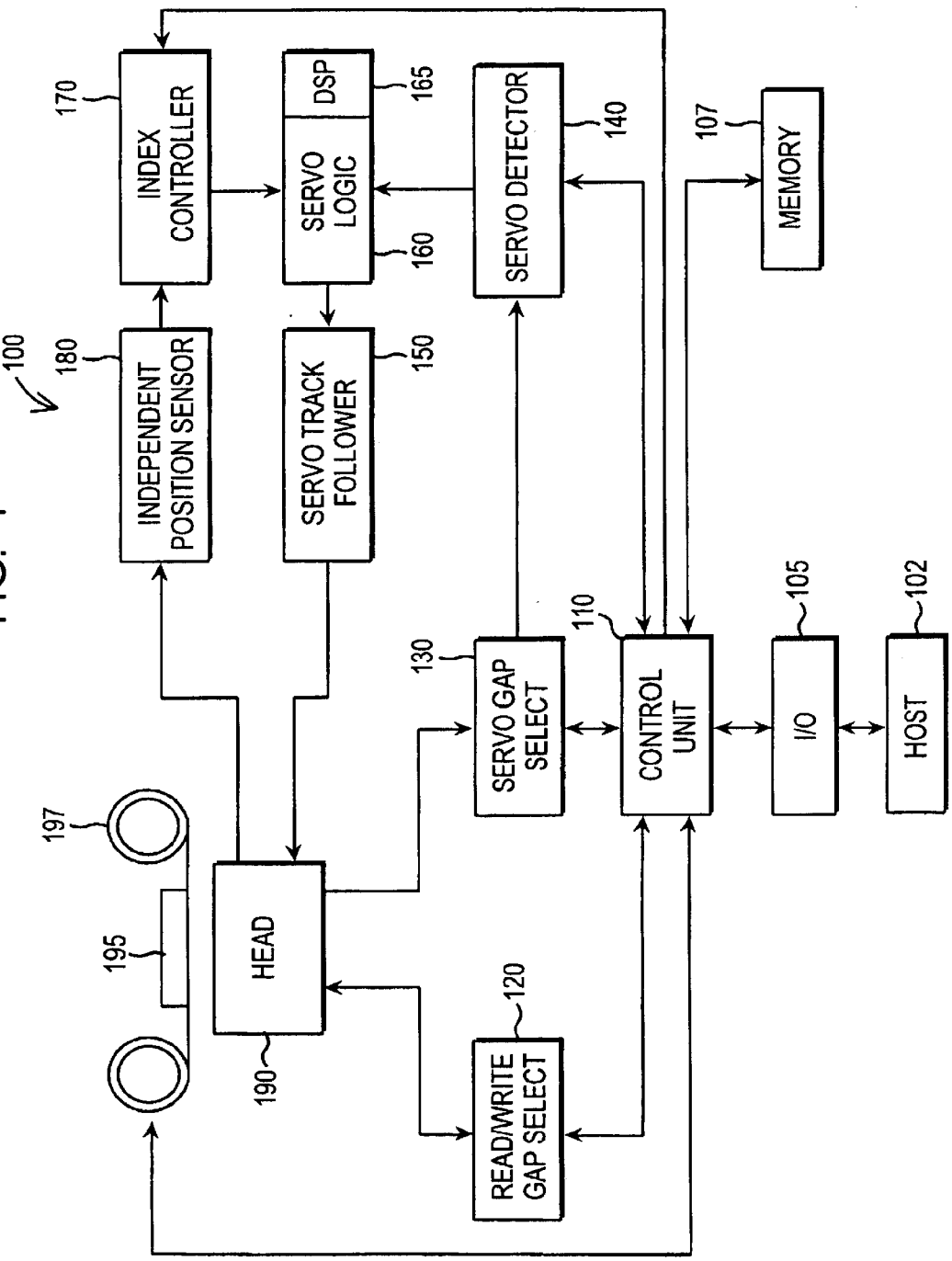
FIG. 1 is a block diagram of an embodiment of a magnetic tape system employing the present invention.

FIG. 1 shows magnetic tape data storage system 100. Control unit 110 receives and transmits data and control signals to and from a host device 102 via an interface 105. The control unit 110 is coupled to a memory device 107, such as a random access memory for storing information and computer programs. An example of a host device 102 comprises an IBM RS/6000 processor.

A multi-element tape head 190 includes a plurality of read/write elements to read and/or record information from and/or to a magnetic tape 197, and servo sensors to detect servo signals comprising prerecorded linear servo edges on the magnetic tape 197. In certain embodiments, magnetic tape head 190 comprises a thin-film magneto-resistive transducer. In an illustrative embodiment, tape head 190 may be constructed as shown in FIG. 2B. The length of the tape head 190 substantially corresponds to the width of the tape 197. In certain embodiments tape head 190 includes thirty-two read/write element pairs (labeled "RD" and "WR") and three sets of servo read elements (e.g. LS1 272, RS6 258) corresponding to the three servo areas 250 (FIG. 2A), 260 (FIG. 2A), and 270 (FIG. 2A). In the illustrated embodiment, the thirty-two read/write element pairs are divided into groups of eight, adjacent groups being separated by two tracks occupied by a group of four servo sensors. Each group of four servo sensors may be referred to as a "servo group", e.g. servo group 255, servo group 265, and servo group 275.

In the illustrated embodiments, tape head 190 includes left and right modules separately fabricated, then bonded together. Write and read elements alternate transversely down the length of each module (i.e., across the width of the tape), beginning with a write element in position on the left module and a read element in the corresponding position on the right module. Thus, each write element in the left module is paired with a read element in the corresponding position on the right module and each read element in the left module is paired with a write element in the corresponding position on the right module such that write/read element pairs alternate transversely with read/write element pairs.

A tape reel motor system (not shown in FIG. 1) moves the tape 197 in a first direction, and optionally in an opposing second direction, along a first axis, i.e. the longitudinal axis of the tape, while it is supported by a tape deck for reading and writing. In certain embodiments, the tape deck does not precisely hold the tape in position laterally. Rather in these embodiments, open channel guiding may be employed in which the magnetic tape can move laterally.

A servo track follower 150 directs the motion of the magnetic tape head 190 in a lateral or transverse direction relative to the longitudinal direction of tape motion, i.e. the tape head moves in a third and an opposing fourth direction along a second axis, where that second axis is substantially orthogonal to the first axis described above. The control unit 110 is coupled to one or more tape reel motors and controls the direction, velocity and acceleration of the tape 197 in the longitudinal direction.

The data tracks on the tape 197 are arranged in parallel and are parallel to the linear servo edges. Thus, as the servo track follower 150 causes the servo sensors of the magnetic tape head to track follow a linear servo edge or a servo index position laterally offset from a servo edge, the read/write elements track a parallel group of the data tracks. If it is desired to track another parallel group of data tracks, the magnetic tape head 190 is indexed laterally to another servo edge or to another servo index position, or a different servo sensor is aligned with the same or a different servo edge or servo index position.

When the magnetic tape head 190 is to be moved to a selected index position, an index controller 170 is enabled by the control unit 110, receiving a lateral position signal from an independent position sensor 180 and transmits an appropriate signal to servo logic 160 to select the appropriate servo track, while the control unit 110 transmits an appropriate signal to a servo gap selector 130 to select the appropriate servo sensor. The independent position sensor 180 is discussed in the incorporated U.S. Pat. No. 5,946,159, where it is called a non-servo position sensor, and indicates the lateral mechanical position of the tape head 190 with respect to the tape path 195.

Over the course of longer distances of longitudinal tape movement, the open channel guiding system will allow the tape to move laterally with respect to the tape deck. In accordance with the present invention, the independent position sensor 180, in limited distances of tape movement, accurately tracks the lateral mechanical position of the tape head 190, and therefore of the servo sensor(s), with respect to the magnetic tape 197 and of the servo edges. The logic 160 operates the servo track follower 150 in accordance with the present invention to calibrate the servo index positions as sensed by the servo sensor with respect to the parallel sets of linear servo edges, as will be explained. The logic 160 may comprise a programmed PROM, ASIC or microprocessor.

The tape system 100 may be bidirectional, in which ones of the read/write elements are selected for one direction of longitudinal tape movement, and others of the read/write elements are selected for the opposite direction of movement. The control unit 110 additionally selects the appropriate ones of the read/write elements by transmitting a signal to a read/write gap select unit 120.

Once a servo edge or edges are selected, the servo gap selector 130 provides the servo signals to a servo detector 140, which information is employed by servo logic 160 to position the tape head 190 to track follow the detected edges. In accordance with the present invention, servo logic 160 employs the servo information sensed by the servo detector 140 and the mechanical positioning information from the independent position sensor 180 to calibrate the track following servo. The track following servo logic is also implemented in the servo logic 160 employing the sensed servo signals to determine the ratios of the sensed servo signals, which are employed in accordance with the present invention to track a designated servo index position.

Referring to FIG. 2A, a plurality, for example, three, parallel sets of linear servo edges 250, 260 and 270 are illustrated, each servo edge comprising an interface between two dissimilar recorded servo signals, each set of servo edges comprising one of the servo edges on each of opposite lateral sides of a middle recorded servo signal. As an example, a corresponding plurality of laterally offset servo sensors, i.e. servo sensor groups 255 (FIG. 2B), 265 (FIG. 2B), 275 (FIG. 2B), are disposed on tape head 190 to sense the servo signals at each corresponding edge. Additional pluralities of servo sensors, i.e. sensors 272, 274, 276, 278, may be provided to allow positioning of the tape head at additional data tracks.

Figure 3A:
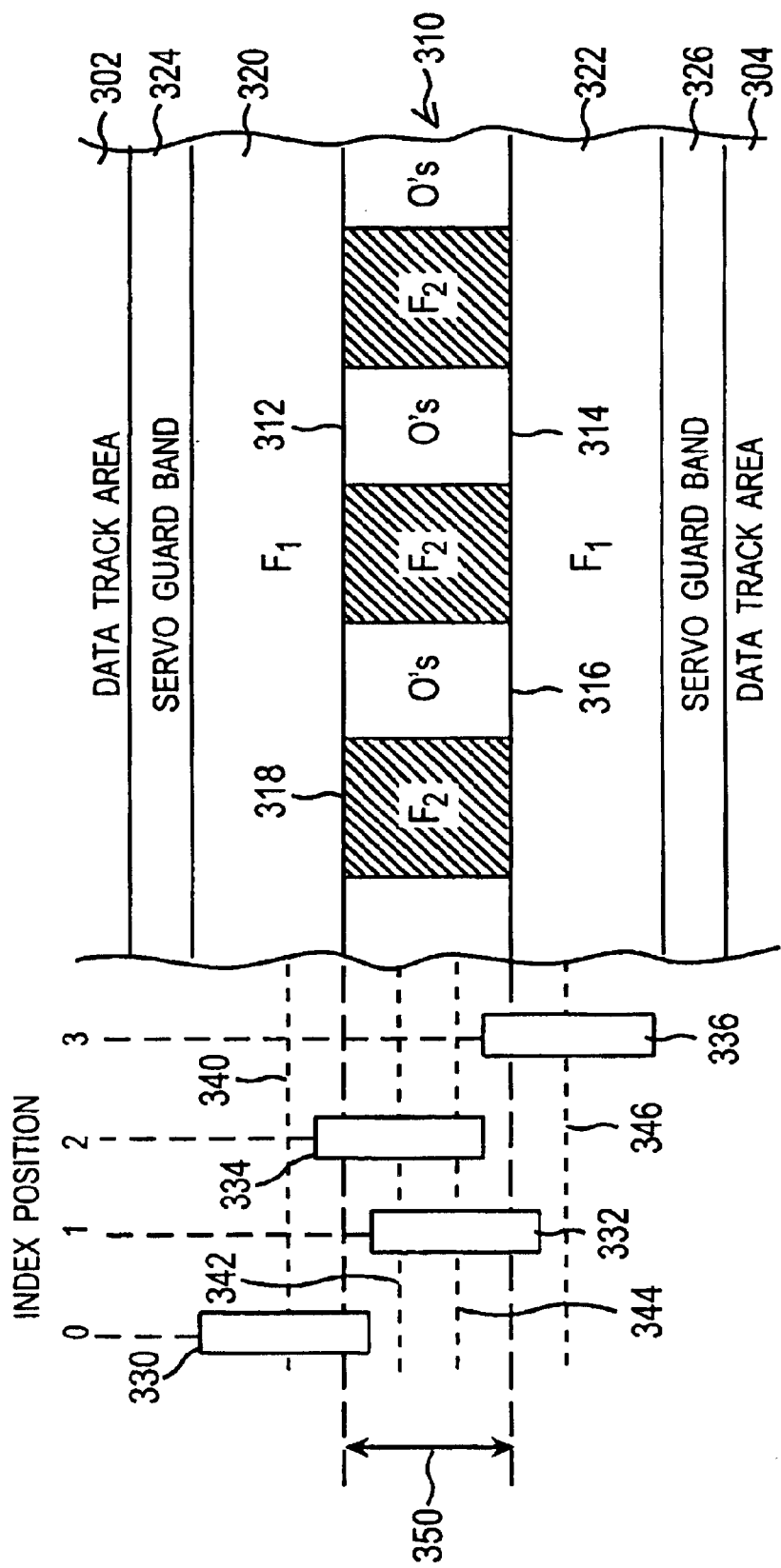
FIG. 3A is a detailed diagrammatic representation of a magnetic tape format providing four servo index positions in one set of two linear servo edges of the magnetic tape of FIG. 2A.

Referring to FIG. 3A, the typical magnetic tape format of servo signals to form linear servo edges 312 and 314 comprising an interface between two dissimilar recorded servo signals is illustrated. One set of servo edges comprises outer bands 320 and 322, having a recorded pattern of a constant amplitude signal of a single first frequency, on either side of an inner band 310 of the other servo signal, having a recorded pattern alternating between a constant amplitude burst signal 318 of a single second frequency and a zero amplitude null signal 316. Typically, the servo signals 320, 310 and 322 are provided with servo guard bands 324 and 326 to protect the outer bands 320 and 322 from noise resulting from the data track areas 302 and 304.

It is desirable that the servo edges are separated by a predetermined nominal distance 350 employed for prerecording the servo signals. Typically, the outer servo signals 320, 322 are recorded first, and the center servo signal 310 is recorded last, to provide the servo edges 312, 314. There is, typically, variation in the magnetic separation 350 between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation 350 distance of the prerecorded servo tracks from nominal, the prerecording of the servo signals is conducted at different amplitudes so as to attempt to compensate for the physical difference and provide a magnetic pattern that is closer to nominal. Additionally, three servo sensors are employed to simultaneously sense the three servo tracks. Thus, the difference in physical distance and the amplitude compensation may tend to offset each other with respect to the resultant apparent distance between the servo tracks. These actions may provide an adequate signal for track following at the servo edges.

However, to increase data track density, in the embodiment of FIG. 3A four servo index positions, i.e. index positions 0, 1, 2, and 3, are calibrated. These index positions are laterally offset with respect to the sensed servo edges of the set of linear servo edges. Index position 0 corresponds to sensor placement 330 over tape track position 340. Similarly, index positions 1, 2, and 3, respectively, correspond to sensor placements 332, 334, and 336, respectively, over tape track positions 342, 344, and 346, respectively. The relative positions of these four index positions are: 0, 2, 1, 3.

As an example, the servo index positions may be offset laterally about one quarter the width of the inner band 310 away from the servo edge in either direction, providing four index positions. The indexed positions are determined by measuring the ratios between the amplitudes of the two dissimilar recorded servo signals, e.g., as measured by the servo detector 140 of FIG. 1, and mapping those ratios into physical distances in microns. The servo logic 160 operates the servo track follower 150 to track follow at the desired measured ratio. For example, the measured ratio will be the ratio between the sum of the sensed outer band signal 320 plus the inner band signal 318, and the sensed outer band signal 320, giving effect to the null 316. The illustrations and descriptions herein employ this ratio.

Alternatively, the measured ratio may be the ratio between the outer band signal 320 at frequency F1 and the inner band signal 318 at frequency F2. In order to center the data read/write elements at each of the servo index positions, the ratios must be measured precisely. Thus, when the amplitudes of the recorded servo signals are varied to compensate for physical distance variations, the measured ratios are distorted and track following the prerecorded servo edges at the offset indexed positions becomes less precise. As the result, the data tracks may vary from the desired positions, for example, squeezed together, such that writing on one track with a write element that is subject to track misregistration (TMR) may cause a data error on the immediately adjacent data track.

Figure 3B:
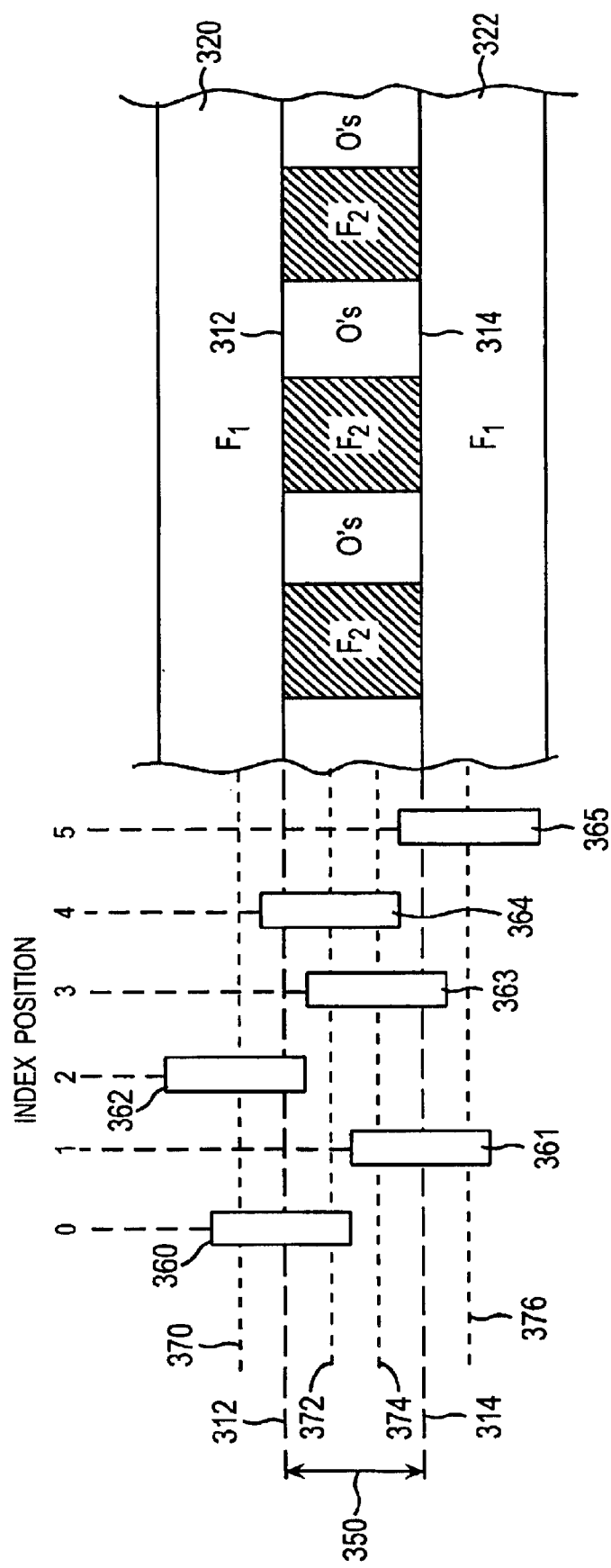
FIG. 3B is a detailed diagrammatic representation of a magnetic tape format providing six servo index positions in one set of two linear servo edges of the magnetic tape of FIG. 2A.

FIG. 3B illustrates another embodiment of displaced index positions that may be employed with the present invention. This embodiment includes six index positions, i.e. index positions 0, 1, 2, 3, 4, and 5. At the "0" or "1" index positions, the servo element is located at position 360 centered on servo edge 312 or at position 361 centered on servo edge 314. Additional index positions are provided which are aligned such that a servo element is displaced from an edge 312 or 314 in either direction. As the result, the number of index positions becomes six. The relative positions of these six index positions are: 2, 0, 4, 3, 1, 5.

In order to center the data read/write elements in the "2" and "5" index positions, the servo read element must be located at position 362 or at position 365, and will read a minimum signal that has an amplitude ratio of about ⅚ of the maximum signal, and to center the data read/write elements in the "3" and "4" index positions, the servo read element must be located at position 363 or at position 364, and will read a minimum signal that has an amplitude ratio of about ⅙ of the maximum signal.

To track follow an edge or edges, once a servo edge or edges are selected, the servo gap selector 130 of FIG. 1 provides the servo signals to a servo detector 140, which digitally detects the servo signals at a predetermined sample rate, and provides servo signal ratios of each of the selected servo sensors. The servo logic 160 employs the servo signal ratios to determine the displacement from the edges and operates the servo loop servo track follower 150 to position the tape head 190 to track follow at the desired displacement from the edges.

Figure 4A:
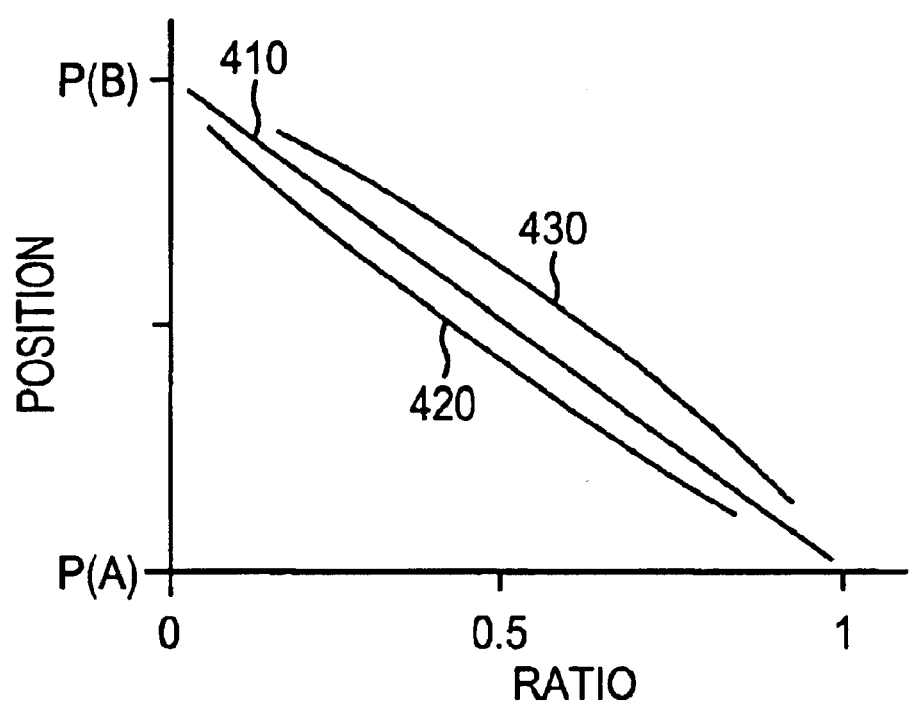
FIG. 4A is a diagrammatic representation of the relationships between ratios of the sensed servo signals of a servo edge of FIG. 2A and their corresponding lateral positions, where the recorded servo signals generating the edge are of three different amplitudes.

FIG. 4A illustrates examples of distortion of the measured ratios between the sensed servo signals of one linear servo edge, at various lateral positions of the servo sensors. Referring additionally to FIGS. 3A and 3B regarding servo sensor placement, in an ideal relationship, the ratio of signals varies linearly from a value of "1" when the servo sensor is at position $P_{(A)}$, which is centered on and senses only the outer band 320 or outer band 322, to a value of "0" when the servo sensor is at position $P_{(B)}$, which is centered on and senses only the inner band 310. Straight line 410 graphically illustrates such an ideal relationship.

Figure 4B:
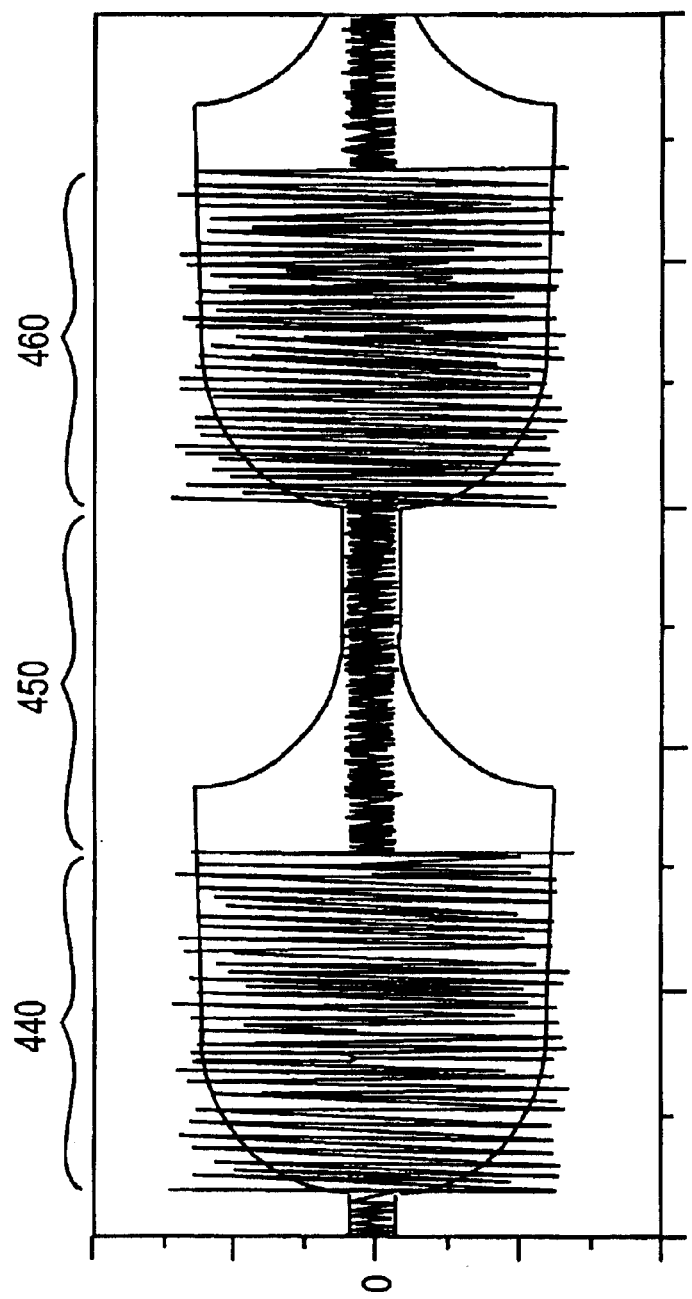
FIG. 4B shows analog servo signals detected at a first index position.
Figure 4C:
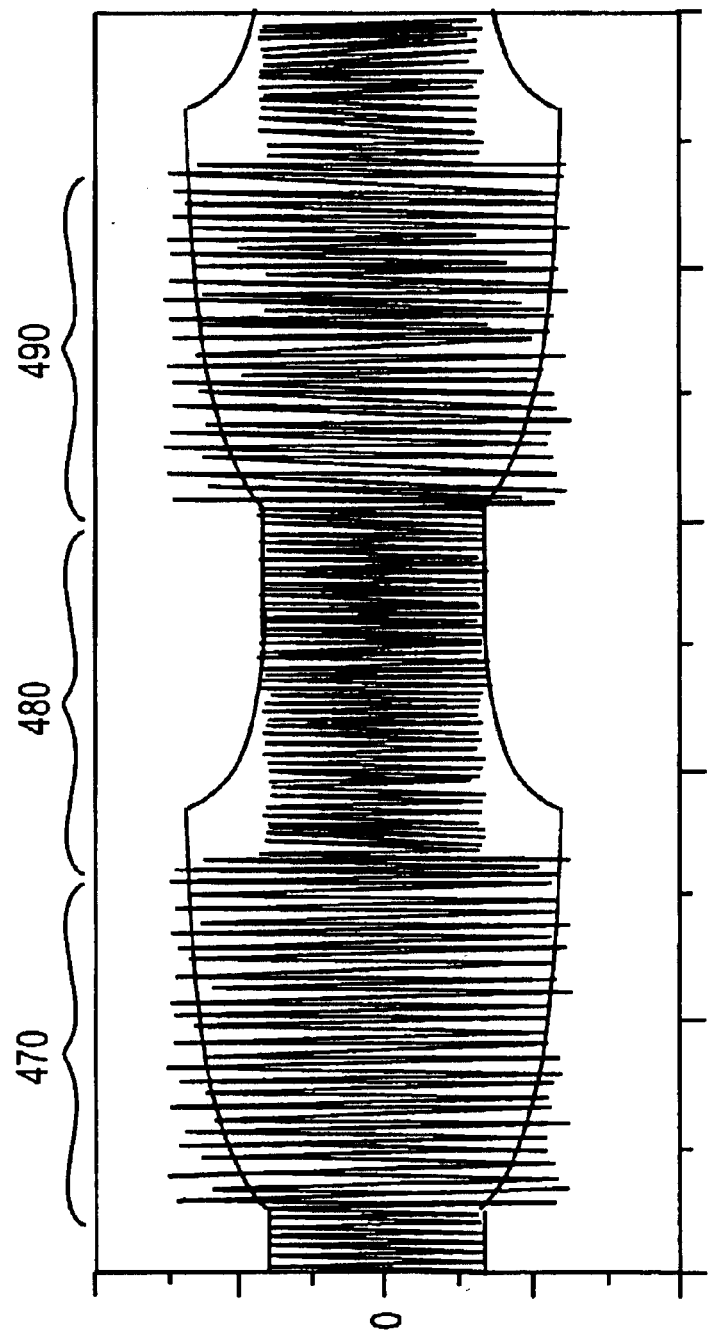
FIG. 4C shows analog servo signals detected at a second index position.

Curve 420 comprises a graphical representation of more typical ratios of servo signals, where the center recorded servo signal 310 generating the edges is of a relatively weak amplitude. FIGS. 4B and 4C illustrate wave forms of the analog signal from the servo transducer at, respectively, positions 332 and 336 of FIG. 3A. Thus, in FIG. 4B, the bursts 440 and 460 formed while the servo transducer is at position 332 of FIG. 3A from the combination of the first frequency and the second frequency burst is at a high amplitude, but the burst 450 formed from the combination of the first frequency and the null signal is at a very low amplitude because only a small portion of the servo transducer is positioned over the first frequency. In FIG. 4C, the bursts 470 and 490 formed while the servo transducer is at position 336 of FIG. 3A from the combination of the first frequency and the second frequency burst is at a high amplitude, as is the burst 480 formed from the combination of the first frequency and the null signal, because the servo transducer is positioned primarily over the first frequency.

Referring again to FIG. 4A, curve 430 comprises a graphical representation of more typical ratios of servo signals as a function of servo sensor location where the center recorded servo signal 310 generating the edges is of a relatively strong amplitude. As those skilled in the art will appreciate, curves 420 and 430 do not show a linear relationship between the ratios of measured servo signals and servo sensor placement. In light of the differing, and complex, relationship between the ratio of measured servo signals as a function of servo sensor location, employing the same ratio setting to position the tape head at various servo index positions for each of the linear edges may result in track misregistration.

To enhance the accuracy with which a tape drive reads, and especially writes, information to a certain tape, the tape drive is calibrated each time a tape cartridge is mounted therein. Various methods are known in the art to accomplish such a calibration. For example, U.S. Pat. No. 5,629,813, assigned to the common assignee hereof, teaches a method to calibrate a tape drive wherein a newly mounted tape is moved and servo signal ratios, i.e. position error signals, are obtained and stored for future tape tracking. Pending Application having Patent Application Publication No. 2003/0128457, assigned to the common assignee hereof, teaches a method to calibrate a tape drive wherein servo signal ratios in combination with independent sensor signals are detected and digital waveforms formed therefrom. Those digital waveforms are filtered using a Fast Fourier Transform/Inverse Fast Fourier Transform algorithms. Those filtered waveforms are then used to calibrate one or more index positions, i.e. PES signals. Pending Application entitled Method And Apparatus To Calibrate One or More Transducers In A Noisy Environment, filed on Jun. 27, 2002, Ser. No. 10/185125 assigned to the common assignee hereof, teaches a method to calibrate a tape drive wherein servo signal ratios in combination with independent sensor signals are detected and digital waveforms formed therefrom. Those digital waveforms are filtered using the real and imaginary components of those waveforms at selected frequencies. Those filtered waveforms are then used to calibrate one or more index positions, i.e. PES signals.

Having calibrated the tape drive, i.e. having calculated and stored the read and write offsets for one or more index positions for a specified tape, such as tape 197 (FIG. 1), the tape drive, such as tape drive 100 (FIG. 1), is ready to perform normal read/write operations. The control unit 110 (FIG. 1) receives a command from the host 102 (FIG. 1) to read and/or write data from and/or to a particular set of tracks on the tape 197 and directs the index controller 170 (FIG. 1) to move the tape head 190 to the index position necessary to access the desired tracks. The control unit 110 also sends direction and group select commands to the servo gap select device 130 (FIG. 1) to activate (or accept signals from) the upper or lower group of servo elements of the right or left module corresponding to the tracks to be accessed.

To read and/or write data from and/or to the tape 197, the respective read or write offsets for each of the three selected servo elements are recovered by the control unit 110 from the memory 107 (FIG. 1) and the tape 197 begins to move in the appropriate direction. Each of the three active servo elements senses the servo patterns in the servo areas and generates a measured PES signal. Because of possible discrepancies, as previously described, one or more of the elements may not be centered on the servo area edges, prior art methods averaged those measured PES signals to provide satisfactory servo positioning. Servo positioning using these prior art methods is performed by the servo track follower on the basis of the averaged PES, thereby maintaining a closer alignment of the three servo elements relative to the servo area edges during the track access.

Applicants have discovered, however, that using the newly-developed calibration methods discussed above, the accuracy and precision of the load-time calibration has improved dramatically. Therefore, the requirement to use prior art methods to average the measured PES signals is now lessened. Nevertheless, because the allowable error margin for track following has been significantly reduced due to increased information storage density, i.e. reduced track width, noise present in a PES signal can cause a large enough perturbation in the error feedback signal to cause the servo logic to flag a temporary error. Moreover, the magnitude of the PES noise on a single sample can greatly exceed the allowed offtrack margin. Therefore, one of the three measured PES signals indicating an offtrack condition for a number of samples can cause an offtrack shutdown or stop write wherein the tape drive unit records a transient error while stopping the tape and then attempts to rewrite the data block.

The magnitude of the PES errors caused by tape defects relative to the allowed offtrack margin is the cause of the problem. In certain embodiments the maximum offtrack margin is 4 microns. The impulse noise in the PES signal, however, can be 20 microns for a single sample when a tape defect is encountered. Applicants' method provides a mechanism to filter out the impulse noise from a single PES signal while providing an accurate measure of the head position without introducing phase lag into the Composite PES signal.

Applicants' method utilizes non-uniform PES averaging to form a Composite PES signal using weighted individual PES signals rather than simply averaging the measured PES signals. In Applicants' method, each PES signal is "weighted" based upon its deviation from a target value. Applicants' weighting factor is inversely proportional to the difference between the measured PES and the expected PES.

Figure 5:
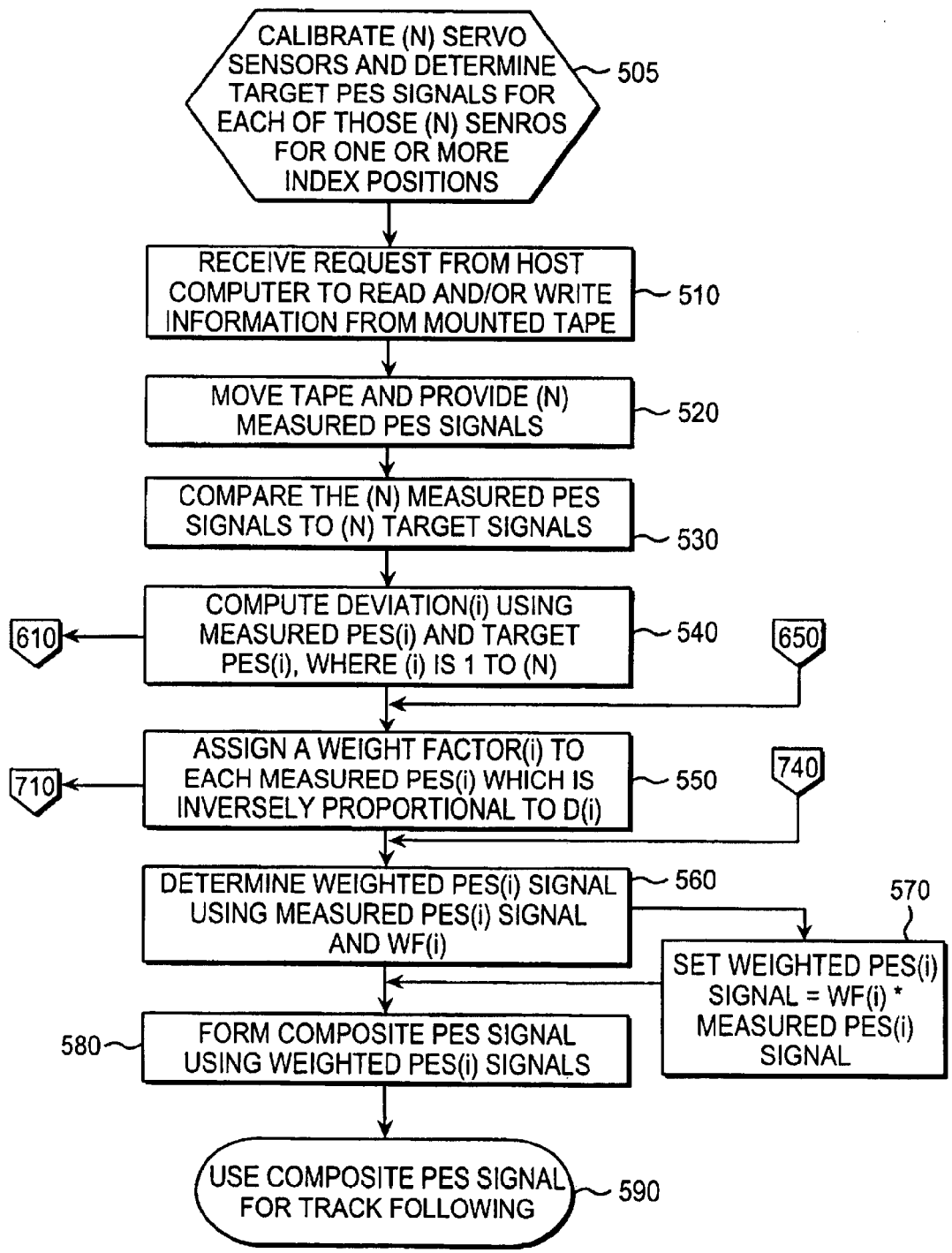
FIG. 5 is a flow chart summarizing the steps of one embodiment Applicants' method.

Referring now to FIG. 5, in step 505 Applicants' method calibrates one or more servo sensors with respect to one or more index positions to form target position error signals ("PES Signals"). Step 505 is performed using any known or novel calibration technique. In certain embodiments, step 505 further includes saving at a first time those target PES Signals in memory, such as memory 107 (FIG. 1). In certain embodiments, step 505 is performed by servo logic, such as logic 160 (FIG. 1). In step 510, the tape system 100 receives a request from a host computer, such as host 102 (FIG. 1), to read and/or write information from and/or to a designated tape medium, such as tape 197 (FIG. 1).

Applicants' method transitions from step 510 to step 520 wherein the tape is moved in the appropriate direction using the specified index position. While track following that moving magnetic tape, one or more PES signals are measured. In certain embodiments, three PES signals are measured. Those measured PES signals are first weighted, and the weighted PES signals are used to form a Composite PES signal that is used to represent the tape's position relative to the head.

In order to reduce the noise present in this composite signal, in Applicants' method the measured PES signal having the smallest absolute error, i.e. that PES signal closest to zero error with respect to the corresponding target PES signal, is given the most weight. The measured PES signal having the greatest absolute error is given the least weighting in the Composite PES signal.

This non-uniform weighting method effectively reduces the noise in the Composite PES signal thereby reducing the amount of artificial error signal the servo loop attempts to follow, thereby reducing the average error in the servo loop positioning. For every servo sample, the three measured PES signals are ranked according to the difference between that measured value and the calculated target value.

In step 530 Applicants' method compares the measured PES signals to their respective target values determined during the earlier calibration procedure. In certain embodiments, step 530 includes recalling at a second time the target PES values from memory, such as memory 107 (FIG. 1). In step 540, Applicants' method calculates a deviation $D_{(i)}$ for the (i)th servo sensor, where that $D_{(i)}$ comprises the absolute value of the difference between the measured PES(i) and the target PES(i). In certain embodiments, the target PES(i) value comprises an expected value based upon the earlier calibration procedure. In certain embodiments, the target PES(i) value comprises an average of previously measured PES values. In certain embodiments, the target PES(i) value comprises a projected value based upon, inter alia, an estimated value, an averaged value, and combinations thereof.

Figure 6:
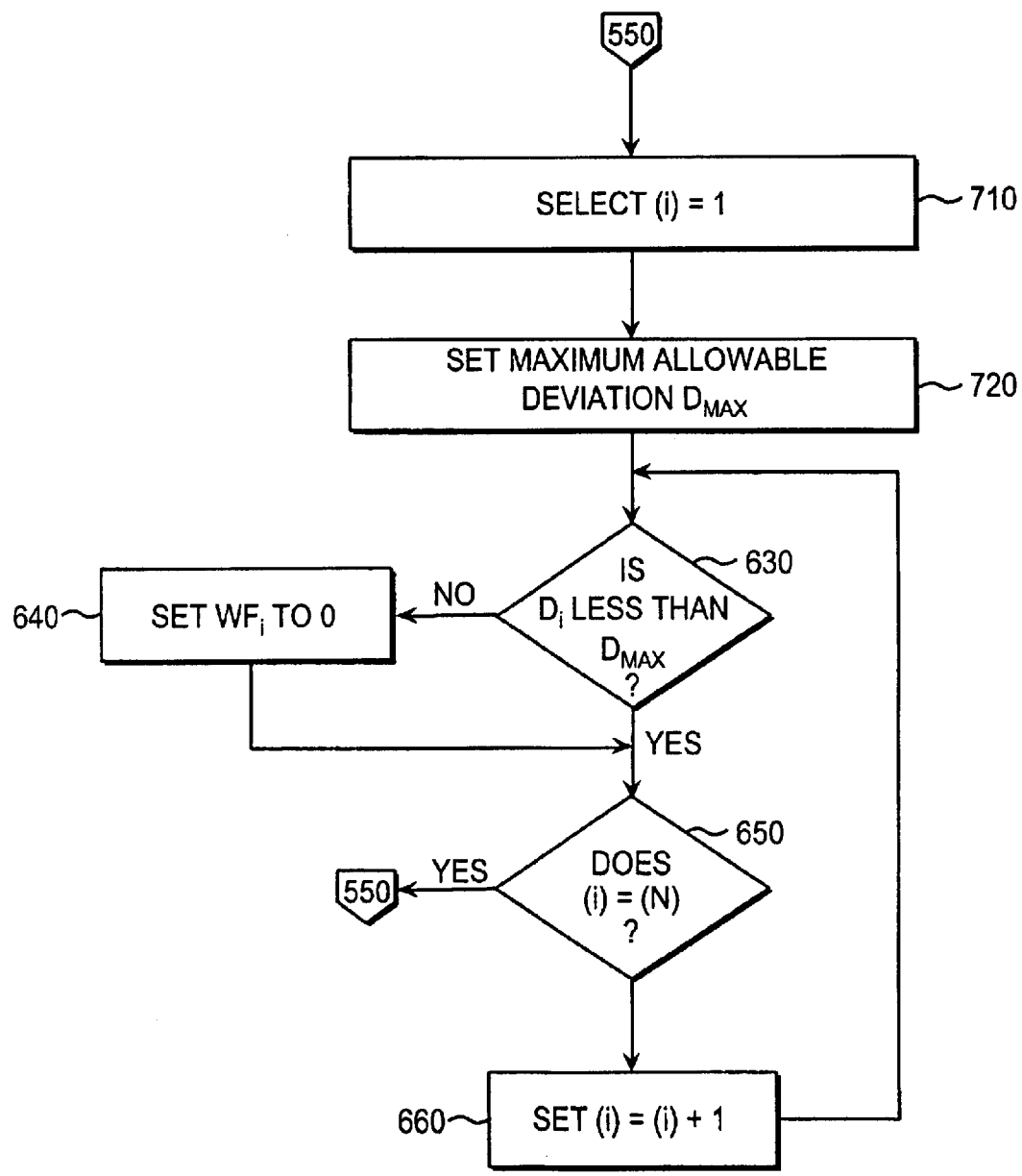
FIG. 6 is a flow chart summarizing additional steps in a second embodiment of Applicants' method.

In certain embodiments, Applicants' method transitions from step 540 to step 610 (FIG. 6). In other embodiments, Applicants' method transitions from step 540 to step 550 wherein Applicants' method assigns a Weight Factor, WF, to each of the measured PES Signals, where each Weight Factor WF(i) is inversely proportional to D(i). In certain embodiments, step 550 also includes ranking the measured PES Signals, based upon their respective Deviations computed in step 540, to form (N) ranked PES Signals. In these embodiments, the measured PES Signal having the smallest Deviation comprises Ranked PES(1). The measured PES Signal having the largest Deviation comprises Ranked PES (N). The remaining measured PES Signals are ranked in increasing order based upon their respective Deviations.

Applicants' method transitions from step 550 to step 560 wherein Applicants' method determines (N) Weighted PES signals using the measured PES signals of step 520 and the Weight Factors of step 550. Applicants' method transitions from step 560 to step 580 wherein Applicants' method forms a Composite PES signal using the (N) weighted PES signals of step 560. Applicants' method transitions from step 580 to step 590 wherein the Composite PES signal of step 580 is used for track following.

The following examples are presented to further illustrate to persons skilled in the art how to make and use the invention and to identify certain embodiments thereof. These examples are not intended as a limitation, however, upon the scope of the invention, which is defined only by the appended claims.

EXAMPLE I

To describe various embodiments of Applicants' method, Examples I, II, and III, use the data recited in Table 1. In the embodiment of Table 1, three servo sensors each provide a measured PES signal, i.e. measured PES Signals A, B, and C. Thus, in Examples I, II, and III, (N) is three.

TABLE 1

| PES Signal | Deviation From Target Value |
| --- | --- |
| A | 1 |
| B | 2 |
| C | 3 |

Measured PES Signal A deviates 1 micron from its calculated target value based upon the earlier calibration of the tape unit. Measured PES Signals B and C deviate 2 microns and 3 microns, respectively, from their target values.

Prior art methods would average PES Signals A, B, and C, to form an averaged PES Signal of 2.00. Applicants' method, however, forms a Composite PES signal by using a non-uniform averaging of the measured PES(i) values. In this embodiment, in step 540 Applicants' method computes the deviation of each measured PES Signal from its target value. Table 1 recites these deviations.

Applicants' method transitions from step 540 to step 550 wherein Applicants' method assigns a Weight Factor WF(i) for each measured PES Signal based upon the value of D(i). In this embodiment, Applicants' method forms (N) Ranked PES signals, wherein the measured PES(i) signals are first ranked based upon the values of D(i). The measured PES signal having the smallest Deviation, i.e. Ranked $PES_1$, is assigned a Weight Factor of (N). The measured PES signal having the largest Deviation, i.e. Ranked $PES_{(N)}$, is assigned a Weight Factor of 1. In this embodiment, the (j)th Weight Factor is determined using equation (1).

$$WF(j)=(N+1)-(j) \qquad (1)$$

where (j) is an integer greater than or equal to 1 and less than or equal to (N).

In this Example wherein (N) equals 3, the measured PES Signal having the smallest deviation, i.e. $PES_A$, comprises Ranked $PES_1$ and is assigned a Weight Factor of 3. The measured PES Signal having the next smallest deviation, i.e. $PES_B$, comprises Ranked $PES_2$ and is assigned a Weight Factor of 2. The PES Signal having the largest deviation, i.e. $PES_C$, comprises $PES_3$ and is assigned a Weight Factor of 1.

Applicants' method transitions from step 550 to step 560 wherein weighted PES Signals are formed using the Ranked PES(j) signals and the Weight Factors of step 550. In this embodiment, the (j)th Weighted PES signal is formed using equation (2).

$$\text{Weighted } PES(j)=\text{Ranked } PES(j)*WF(j) \qquad (2)$$

In this Example, weighted $PES_1$ is formed by multiplying $WF_1$, i.e. 3, times Ranked $PES_1$, i.e. 1, to give Weighted $PES_1$ of 3. Similarly, Weighted $PES_2$ is calculated to be 4, and Weighted $PES_3$ is calculated to be 3.

Applicants' method transitions from step 560 to step 580 wherein a Composite PES signal is formed using the Weighted PES signals of step 560. In this embodiments of Applicants' method, the Weighted PESO(j) signals are summed, and that sum is divided by $\Sigma(N)$, which equals $[(N)(N+1)]/2$, to give a non-uniformly weighted Composite PES signal. In this Example, Applicants' Composite PES signal is formed by adding Weighted $PES_1$, Weighted $PES_2$, and Weighted $PES_3$, and dividing that total by 6. In this Example, Applicants' Composite PES signal equals 1.67.

Those skilled in the art will appreciate, where each of the measured PES Signals has the same deviation from its respective target value, then Applicants' Composite PES signal formed using this embodiment of Applicants' method is equal to the prior art simple average of the measured PES Signals.

EXAMPLE II

Again using the values for measured $PES_A$, $PES_B$, and $PES_C$, and the values of $D_A$, $D_B$, and $D_C$, all from Table 1, in this embodiment Applicants' method in step 550 assigns a Weight Factor WF(i) to each measured PES(i), where that WF(i) is inversely proportional to D(i). Once again, Applicants' method uses a non-uniform averaging of PES Signals A, B, and C.

In this embodiment, in step 540 Applicants' method first identifies the PES Signal having the minimum deviation $D_{iMIN}$ from the target value. In this Example, PES Signal A comprises that least deviating measured PES Signal, where $D_{iMIN}$, i.e. $D_A$, is 1. In this embodiment of Applicants' method, measured PES Signals B and C are "weighted" in the composite PES based upon their deviations from their respective targets, and based upon comparisons of those deviations with $D_{iMIN}$.

In this embodiment, Applicants' method calculates a difference factor DF(i) for each of measured PES signals. For example, $DF_B$ comprises the difference factor for $PES_B$. In this embodiment, the difference factor for $PES_B$ is formed using equation (3).

$$DF_B = (D_B - D_{iMIN})/(D_B + D_{iMIN}) \quad (3)$$

In this Example, $D_{iMIN}$ is 1 and $D_B$ is 2, therefore $DF_B$ is calculated using equation (3) to be 0.3333. Similarly in this Example, the Difference Factor for $PES_C$, $DF_C$ is calculated to be 0.50. In this embodiment, the difference factor $DF_i$ for the (i)th measured PES Signal is formed using the equation $DF_i = (D_i - D_{iMIN})/(D_i + D_{iMIN})$. Those skilled in the art will appreciate that $DF_A$ equals 0. Those skilled in the art will further appreciate, that if $D_B$ and/or $D_C$ equals $D_{iMIN}$, then $DF_B$ and/or $DF_C$ are also 0.

In this embodiment of Applicants' invention, further in step 550 Applicants' method computes the Weight Factor $WF_i$ for the (i)th PES Signal using equation (4)

$$WF_i = 1 - DF_i \quad (4)$$

In this Example, the Weight Factor for $PES_B$, $WF_B$, equals $1 - 0.333$ or 0.667. Similarly in this embodiment, $WF_C$ equals $1 - DF_C$, or $1 - 0.50$. Thus, $WF_C$ equals 0.50. Those skilled in the art will appreciate, that $WF_A$ equals 1.00. Those skilled in the art will also appreciate that where $D_B$ and/or $D_C$ equals $D_{iMIN}$, then $WF_B$ and/or $WF_C$ also equal 1.00.

In step 560, Applicants' method forms a weighted PES(i) using the measured PES(i) signal and the WF(i) formed in step 550. In this embodiment, Applicants method in step 570 uses equation (5) to form the weighted PES(i) value.

$$\text{Weighted } PES_i = \text{Measured } PES_i * WF_i \quad (5)$$

In this Example, weighted $PES_B$ equals 1.33, where that weighted value is formed by multiplying the measured $PES_B$, i.e. 2, times $WF_B$, or 0.66. In this Example, the weighted value for $PES_C$ is 1.50, formed by multiplying measured $PES_C$, i.e. 3, times $WF_C$, i.e. 0.50.

In step 580 of this embodiment, Applicants' method forms a Composite PES signal by averaging the weighted PES signals formed in step 570. In this example, Applicants' Composite PES signal is the average of 1.0, 1.33, and 1.5, giving a non-uniformly weighted Composite PES signal of 1.278. As noted above, prior art methods would compute an averaged PES Signal for PES signals A, B, and C, of 2.0.

In the event all three measured PES Signals have the same absolute deviation from their respective target values, then $DF_A$, $DF_B$, and $DF_C$, all equal 0, and therefore, $WF_A$, $WF_B$, and $WF_C$, all equal 1. Thus, where each measured PES Signal has the same absolute deviation from its target value, Applicants' Composite PES signal is identical to the prior art simple average of those PES Signals.

EXAMPLE III

In certain embodiments, Applicants' method adjusts the weight given to each measured PES Signal depending on the noise in the system. In these embodiment, Applicants' method transitions from step 550 to step 710. In step 710, Applicants' method determines the value for $D_{iMIN}$. In these embodiment, the Difference Factor $DF_i$ is calculated in step 730 using equation (6).

$$DF_i = [(D_i - D_{iMIN})/(D_i + D_{iMIN})]^n \quad (6)$$

In step 720, the value of (n) is selected. In various embodiments (n) has a value greater than 0 and less than or equal to about 4. In this Example III, (n) is set to 2. As those skilled in the art will appreciate, in Example II above, (n) equals 1. Using the deviation values of Table 1, $DF_B$ in this Example equals $(0.333)^2$, or 0.111. $DF_C$ equals $(0.50)^2$, or 0.25.

In step 740 using equation (4), $WF_B$ is calculated to be $1 - 0.111$, or 0.89, and $WF_C$ is calculated to be 0.75. Applicants' method transitions from step 740 to step 560 wherein weighted PES Signals are determined using equation (5). In this Example, weighted PESA is calculated to be 1, weighted PESB is calculated to be 1.78, and weighted PESC is calculated to be 2.25.

In step 580, in this Example Applicants' method forms a Composite PES signal by averaging the weighted PES(i) values set in step 570. In this Example, Applicants' method forms a Composite PES signal of 1.68.

Table 2 summarizes the values for $DF_A$, $DF_B$, $DF_C$, $WF_A$, $WF_B$, $WF_C$, based upon the deviations of Table I, and using the embodiments of Applicants' method discussed in Examples I II, and III.

TABLE 2

NON-UNIFORM PES AVERAGING

| Measured PES | Prior Art | Example I | | Example II | | | Example III | | |
|---|---|---|---|---|---|---|---|---|---|
| | | Weight Factor | Weighted PES | Difference Factor | Weight Factor | Weighted PES | Difference Factor | Weight Factor | Weighted PES |
| 1 | | 3 | 3 | 0.00 | 1.00 | 1 | 0.00 | 1.00 | 1 |
| 2 | | 2 | 4 | 0.33 | 0.67 | 1.33 | 0.11 | 0.89 | 1.78 |
| 3 | | 1 | 3 | 0.50 | 0.50 | 1.50 | 0.25 | 0.75 | 2.25 |
| Composite PES | 2.00 | | 1.67 | | | 1.28 | | | 1.68 |

In certain embodiment of Applicants' invention, Applicants' method examines each deviation D(i) formed in step 540 to determine if that deviation exceeds a maximum deviation limit. In these embodiments, Applicants' method transitions from step 540 to step 610 wherein the deviation for a first PES is selected, i.e. (i) is set to 1.

In step 620, the maximum allowable deviation $D_{MAX}$ is set. In certain embodiments, step 620 is performed by the servo logic, such as logic 160 (FIG. 1). In certain embodiments, the value for $D_{MAX}$ is set in firmware disposed in logic 160. In certain embodiments, the value for $D_{MAX}$ is set by Applicants' method based upon the noise in the system. In certain embodiments, the value for $D_{MAX}$ is established at system start-up. In certain embodiments, the value for $D_{MAX}$ is modifiable by the system user.

In step 630, Applicants' method determines if $D_i$ is less than $D_{MAX}$. If Applicants' method determines in step 630 that $D_i$ is not less than $D_{MAX}$, then Applicants' method transitions from step 630 to step 640 wherein $WF_i$ is set to 0. As those skilled in the art will appreciate, the weighted PES(i) then becomes 0. Thus, if D(i) exceeds $D_{MAX}$, then PES(i) is not used to form Applicants' Composite PES signal. Applicants' method transitions from step 640 to step 650.

If Applicants' method determines in step 630 that $D_i$ is less than $D_{MAX}$, then Applicants' method transitions from step 630 to step 650 wherein Applicants' method determines if all the deviations of step 540 have been examined, i.e. determines if (i) equals (N). In the event Applicants' method determines that (i) equals (n), then Applicants' method transitions from step 650 to step 550 (FIG. 5). If Applicants' method determines in step 650 that (i) does not equal (N), then Applicants' method transitions to step 660 wherein (i) is incremented. Applicants' method transitions from step 660 to step 630.

Figure 7:
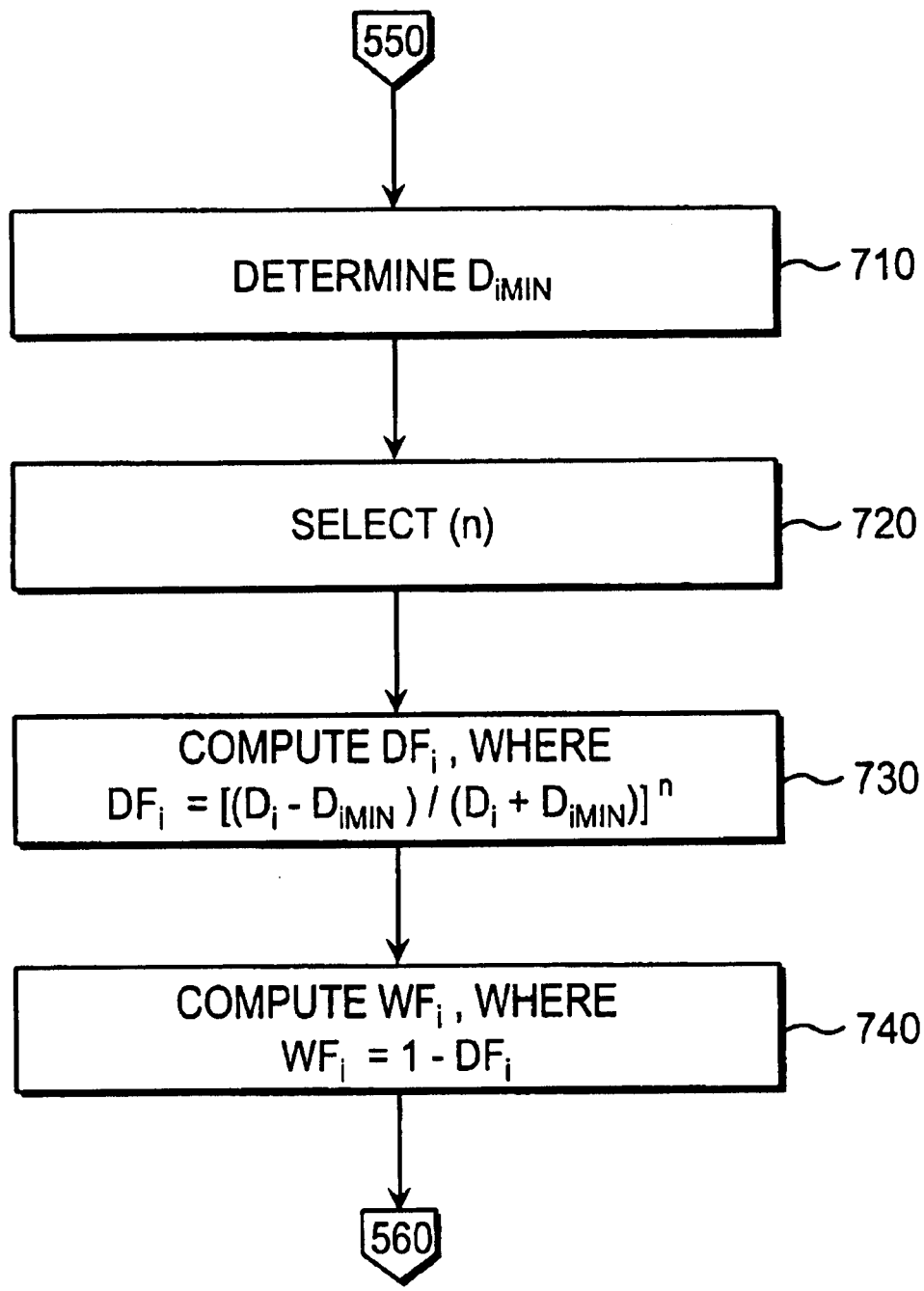
FIG. 7 is a flow chart summarizing additional steps in a third embodiment of Applicants' method.

In certain embodiments, one or more individual steps of Applicants' method summarized in FIGS. 5, 6, and 7, may be combined, eliminated, or reordered.

Applicants' invention further includes an article of manufacture comprising a computer useable medium having computer readable program code disposed therein for reading and/or writing information from and/or to a moving magnetic tape using a tape head disposed adjacent said magnetic tape, wherein said tape head includes (N) servo sensors and wherein said magnetic tape includes (N) servo edges, each servo edge comprising an interface between a first recorded signal and a second recorded signal, wherein each of said (N) servo sensors detects said first recorded signal and said second recorded signal.

Applicants' invention further includes a computer program product usable with a programmable computer processor having computer readable program code embodied therein for reading and/or writing information from and/or to a moving magnetic tape using a tape head disposed adjacent said magnetic tape, wherein said tape head includes (N) servo sensors and wherein said magnetic tape includes (N) servo edges, each servo edge comprising an interface between a first recorded signal and a second recorded signal, wherein each of said (N) servo sensors detects said first recorded signal and said second recorded signal.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to read and/or write information from and/or to a moving magnetic tape using a tape head disposed adjacent said magnetic tape, wherein said tape head includes (N) servo sensors and wherein said magnetic tape includes (N) servo edges, each servo edge comprising an interface between a first recorded signal and a second recorded signal, wherein each of said (N) servo sensors detects said first recorded signal and said second recorded signal, said method comprising the steps of:

determining (N) target PES signals, wherein the (i)th target PES signal is established for the (i)th servo sensor, and wherein (i) is an integer greater than or equal to 1 and less than or equal to (N);

providing (N) measured PES signals, wherein the (i)th servo sensor provides the (i)th measured PES signal;

calculating (N) deviations, wherein $D_i$ comprises the absolute magnitude of the difference between the (i)th measured PES signal and the (i)th target PES signal;

assigning (N) Weight Factors, wherein $WF_i$ comprises the assigned Weight Factor for the (i)th measured PES signal, and wherein $WF_i$ is inversely proportional to $D_i$;

forming (N) weighted PES signals, wherein the (i)th weighted PES signal is formed by multiplying the (i)th Weight Factor times the (i)th measured PES signal;

computing a Composite PES signal using said (N) weighted PES signals;

positioning said tape head using said Composite PES signal.

2. The method of claim 1, further comprising the steps of:

setting a maximum deviation $D_{MAX}$;

comparing each $D_i$ to $D_{MAX}$; and setting each $WF_i$ to 0 where $D_i$ is greater than or equal to $D_{MAX}$.

3. The method of claim 1, further comprising the step of receiving a request from a host computer to read and/or write said information.

4. The method of claim 1, further comprising the steps of:

storing at a first time said (N) target PES signals; and providing at a second time said (N) target PES signals.

5. The method of claim 1, wherein determining step further comprises determining said (N) target PES signals for each of one or more index positions offset laterally from each of said (N) servo edges.

6. The method of claim 5, further comprising the step of selecting one of said one or more index positions.

7. The method of claim 1, further comprising the steps of:
ranking said (N) measured PES(i) Signals based upon the values of D(i) to form (N) Ranked PES(j) signals, wherein the measured PES(i) having the minimum D(i) is set to Ranked PES(1), and wherein the measured PES(i) having the maximum D(i) is set to Ranked PES(N);
assigning a Weight Factor WF(j) for each of said Ranked PES(j) signals, wherein $$WF(j)=(N)+1-(j)$$

and wherein (j) is an integer greater than or equal to 1 and less than or equal to (N);
determining (N) weighted PES(j) values, wherein $$\text{Weighted } PES(j)=\text{Ranked } PES(j)*WF(j)$$

and wherein (j) is an integer greater than or equal to 1 and less than or equal to (N);
adding said (N) weighted PES(j) values to form a Total Weighted PES Value; and
forming a Composite PES signal by dividing said Total Weighted PES Value by $\Sigma(N)$.

8. The method of claim 1, further comprising the step of:
setting the minimum $D_i$ equal to $D_{iMIN}$;
determining the (i)th difference factor DF, wherein $DF_i$ is determined using the equation $$DF_i=[(D_i-D_{iMIN})/(D_i+D_{iMIN})]^n$$

wherein i is an integer greater than or equal to 1 and less than or equal to (N), and wherein n is greater than or equal to 1 and less than or equal to about 4.

9. The method of claim 8, wherein said assigning step further comprises setting $WF_i$ equal to $1-DF_i$.

10. A method to read and/or write information from and/or to a moving magnetic tape using a tape head disposed adjacent said magnetic tape, wherein said tape head includes (N) servo sensors and wherein said magnetic tape includes (N) servo edges, each servo edge comprising an interface between a first recorded signal and a second recorded signal, wherein each of said (N) servo sensors detects said first recorded signal and said second recorded signal, said method comprising the steps of:
determining (N) target PES signals, wherein the (i)th target PES signal is determined for the (i)th servo sensor, and wherein (i) is an integer greater than or equal to 1 and less than or equal to (N);
providing (N) measured PES signals, wherein the (i)th servo sensor provides the (i)th measured PES signal;
calculating (N) deviations, wherein $D_i$ comprises the absolute magnitude of the difference between the (i)th measured PES signal and the (i)th target PES signal;
ranking said (N) measured PES(i) Signals in increasing order based upon the values of D(i) to form (N) Ranked PES(j) signals, wherein the measured PES(i) having the minimum D(i) is set to Ranked PES(1), and wherein the measured PES(i) having the maximum D(i) is set to Ranked PES(N);
assigning a Weight Factor WF(j) for each of said Ranked PES(j) signals, wherein $$WF(j)=(N)+1-(j)$$

and wherein (j) is an integer greater than or equal to 1 and less than or equal to (N);
determining (N) weighted PES(j) values, wherein $$\text{Weighted } PES(j)=\text{Ranked } PES(j)*WF(j)$$

and wherein (j) is an integer greater than or equal to 1 and less than or equal to (N);
adding said (N) weighted PES(j) values to form a Total Weighted PES Value; and
forming a Composite PES signal by dividing said Total Weighted PES Value by $\Sigma(N)$; and
positioning said tape head using said Composite PES signal.

11. A method to read and/or write information from and/or to a moving magnetic tape using a tape head disposed adjacent said magnetic tape, wherein said tape head includes (N) servo sensors and wherein said magnetic tape includes (N) servo edges, each servo edge comprising an interface between a first recorded signal and a second recorded signal, wherein each of said (N) servo sensors detects said first recorded signal and said second recorded signal, said method comprising the steps of:
determining (N) target PES signals, wherein the (i)th target PES signal is determined for the (i)th servo sensor, and wherein (i) is an integer greater than or equal to 1 and less than or equal to (N);
providing (N) measured PES signals, wherein the (i)th servo sensor provides the (i)th measured PES signal;
calculating (N) deviations, wherein $D_i$ comprises the absolute magnitude of the difference between the (i)th measured PES signal and the (i)th target PES signal;
setting the minimum $D_i$ equal to $D_{iMIN}$;
determining the (i)th difference factor DF, wherein $DF_i$ is determined using the equation $$DF_i=[(D_i-D_{iMIN})/(D_i+D_{iMIN})]^n$$

wherein i is an integer greater than or equal to 1 and less than or equal to (N), and wherein n is 1;
setting $WF_i$ equal to $1-DF_i$;
setting a maximum deviation $D_{MAX}$;
comparing each $D_i$ to $D_{MAX}$;
setting each $WF_i$ to 0 where $D_i$ is greater than or equal to $D_{MAX}$;
forming (N) weighted PES signals, wherein the (i)th weighted PES signal is formed by multiplying the (i)th weight factor times the (i)th measured PES signal;
averaging said (N) weighted PES signals to form a Composite PES signal;
positioning said tape head using said Composite PES signal.

12. An article of manufacture comprising a computer useable medium having computer readable program code disposed therein for reading and/or writing information from and/or to a moving magnetic tape using a tape head disposed adjacent said magnetic tape, wherein said tape head includes (N) servo sensors and wherein said magnetic tape includes (N) servo edges, each servo edge comprising an interface between a first recorded signal and a second recorded signal, wherein each of said (N) servo sensors detects said first recorded signal and said second recorded signal, the computer readable program code comprising a series of computer readable program steps to effect:
determining (N) target PES signals, wherein the (i)th target PES signal is determined for the (i)th servo sensor, and wherein (i) is an integer greater than or equal to 1 and less than or equal to (N);

providing (N) measured PES signals, wherein the (i)th servo sensor provides the (i)th measured PES signal;

calculating (N) deviations, wherein $D_i$ comprises the absolute magnitude of the difference between the (i)th measured PES signal and the (i)th target PES signal;

assigning (N) Weight Factors, wherein $WF_i$ comprises the assigned Weight Factor for the (i)th measured PES signal, and wherein $WF_i$ is inversely proportional to $D_i$;

forming (N) weighted PES signals, wherein the (i)th weighted PES signal is formed by multiplying the (i)th Weight Factor times the (i)th measured PES signal;

computing a Composite PES signal using said (N) weighted PES signals;

positioning said tape head using said Composite PES signal.

13. The article of manufacture of claim 12, wherein said computer readable program code further comprises a series of computer readable program steps to effect:

setting a maximum deviation $D_{MAX}$;

comparing $D_i$ to $D_{MAX}$; and setting $WF_i$ to 0 if $D_i$ is greater than or equal to $D_{MAX}$.

14. The article of manufacture of claim 12, wherein said computer readable program code further comprises a series of computer readable program steps to effect receiving a request from a host computer to read and/or write said information.

15. The article of manufacture of claim 12, wherein said computer readable program code further comprises a series of computer readable program steps to effect:

storing at a first time said (N) target PES signals; and providing at a second time said (N) target PES signals.

16. The article of manufacture of claim 12, wherein said computer readable program code further comprises a series of computer readable program steps to effect determining said (N) target PES signals for each of one or more index positions offset laterally from each of said (N) servo edges.

17. The article of manufacture of claim 16, wherein said computer readable program code further comprises a series of computer readable program steps to effect selecting one of said one or more index positions.

18. The article of manufacture of claim 12, wherein said computer readable program code further comprises a series of computer readable program steps to effect:

ranking said (N) measured PES(i) Signals based upon the values of D(i) to form (N) Ranked PES(j) signals, wherein the measured PES(i) having the minimum D(i) is set to Ranked PES(1), and wherein the measured PES(i) having the maximum D(i) is set to Ranked PES(N);

assigning a Weight Factor WF(j) for each of said Ranked PES(j) signals, wherein $WF(j)=(N)+1-(j)$ and wherein (j) is an integer greater than or equal to 1 and less than or equal to (N);

determining (N) weighted PES(j) values, wherein

Weighted $PES(j)$=Ranked $PES(j)*WF(j)$ and wherein (j) is an integer greater than or equal to 1 and less than or equal to (N);

adding said (N) weighted PES(j) values to form a Total Weighted PES Value; and forming a Composite PES signal by dividing said Total Weighted PES Value by $\Sigma(N)$.

19. The article of manufacture of claim 12, wherein said computer readable program code further comprises a series of computer readable program steps to effect:

setting the minimum $D_i$ equal to $D_{iMIN}$;

determining the (i)th difference factor DF, wherein $DF_i$ is determined using the equation $DF_i=[(D_i-D_{iMIN})/(D_i+D_{iMIN})]^n$ wherein i is an integer greater than or equal to 1 and less than or equal to (N), and wherein n is greater than or equal to 1 and less than or equal to about 4.

20. The article of manufacture of claim 19, wherein said computer readable program code further comprises a series of computer readable program steps to effect setting $WF_i$ equal to $1-DF_i$.

21. An article of manufacture comprising a computer useable medium having computer readable program code disposed therein for reading and/or writing information from and/or to a moving magnetic tape using a tape head disposed adjacent said magnetic tape, wherein said tape head includes (N) servo sensors and wherein said magnetic tape includes (N) servo edges, each servo edge comprising an interface between a first recorded signal and a second recorded signal, wherein each of said (N) servo sensors detects said first recorded signal and said second recorded signal, the computer readable program code comprising a series of computer readable program steps to effect:

determining (N) target PES signals, wherein the (i)th target PES signal is determined for the (i)th servo sensor, and wherein (i) is an integer greater than or equal to 1 and less than or equal to (N);

providing (N) measured PES signals, wherein the (i)th servo sensor provides the (i)th measured PES signal;

calculating (N) deviations, wherein $D_i$ comprises the absolute magnitude of the difference between the (i)th measured PES signal and the (i)th target PES signal;

ranking said (N) measured PES(i) Signals in increasing order based upon the values of D(i) to form (N) Ranked PES(j) signals, wherein the measured PES(i) having the minimum D(i) is set to Ranked PES(1), and wherein the measured PES(i) having the maximum D(i) is set to Ranked PES(N);

assigning a Weight Factor WF(j) for each of said Ranked PES(j) signals, wherein $WF(j)=(N)+1-(j)$ and wherein (j) is an integer greater than or equal to 1 and less than or equal to (N);

determining (N) weighted PES(j) values, wherein

Weighted $PES(j)$=Ranked $PES(j)*WF(j)$ and wherein (j) is an integer greater than or equal to 1 and less than or equal to (N);

adding said (N) weighted PES(j) values to form a Total Weighted PES Value; and forming a Composite PES signal by dividing said Total Weighted PES Value by $\Sigma(N)$; and positioning said tape head using said Composite PES signal.

22. An article of manufacture comprising a computer useable medium having computer readable program code disposed therein for reading and/or writing information from and/or to a moving magnetic tape using a tape head disposed adjacent said magnetic tape, wherein said tape head includes (N) servo sensors and wherein said magnetic tape includes (N) servo edges, each servo edge comprising an interface between a first recorded signal and a second recorded signal, wherein each of said (N) servo sensors detects said first recorded signal and said second recorded signal, the computer readable program code comprising a series of computer readable program steps to effect:

determining (N) target PES signals, wherein the (i)th target PES signal is determined for the (i)th servo sensor, and wherein (i) is an integer greater than or equal to 1 and less than or equal to (N);

providing (N) measured PES signals, wherein the (i)th servo sensor provides the (i)th measured PES signal;

calculating (N) deviations, wherein $D_i$ comprises the absolute magnitude of the difference between the (i)th measured PES signal and the (i)th target PES signal;

setting the minimum $D_i$ equal to $D_{iMIN}$;

determining the (i)th difference factor DF, wherein $DF_i$ is determined using the equation $$DF_i = [(D_i - D_{iMIN})/(D_i + D_{iMIN})]^n$$

wherein i is an integer greater than or equal to 1 and less than or equal to (N), and wherein n is 1;

setting $WF_i$ equal to $1 - DF_i$;

setting a maximum deviation $D_{MAX}$;

comparing each $D_i$ to $D_{MAX}$;

setting each $WF_i$ to 0 where $D_i$ is greater than or equal to $D_{MAX}$;

forming (N) weighted PES signals, wherein the (i)th weighted PES signal is formed by multiplying the (i)th weight factor times the (i)th measured PES signal;

averaging said (N) weighted PES signals to form a Composite PES signal;

positioning said tape head using said Composite PES signal.

23. A computer program product usable with a programmable computer processor having computer readable program code embodied therein to read and/or write information from and/or to a moving magnetic tape using a tape head disposed adjacent said magnetic tape, wherein said tape head includes (N) servo sensors and wherein said magnetic tape includes (N) servo edges, each servo edge comprising an interface between a first recorded signal and a second recorded signal, wherein each of said (N) servo sensors detects said first recorded signal and said second recorded signal, comprising:

computer readable program code which causes said programmable computer processor to calculate (N) target PES signals, wherein the (i)th target PES signal is determined for the (i)th servo sensor, and wherein (i) is an integer greater than or equal to 1 and less than or equal to (N);

computer readable program code which causes said programmable computer processor to provide (N) measured PES signals, wherein the (i)th servo sensor provides the (i)th measured PES signal;

computer readable program code which causes said programmable computer processor to determine (N) deviations, wherein $D_i$ comprises the absolute magnitude of the difference between the (i)th measured PES signal and the (i)th target PES signal;

computer readable program code which causes said programmable computer processor to assign (N) Weight Factors, wherein $WF_i$ comprises the assigned Weight Factor for the (i)th measured PES signal, and wherein $WF_i$ is inversely proportional to $D_i$;

computer readable program code which causes said programmable computer processor to form (N) weighted PES signals, wherein the (i)th weighted PES signal is formed by multiplying the (i)th weight factor times the (i)th measured PES signal;

computer readable program code which causes said programmable computer processor to compute a Composite PES signal using said (N) weighted PES signals;

computer readable program code which causes said programmable computer processor to position said tape head using said Composite PES signal.

24. The computer program product of claim 23, further comprising:

computer readable program code which causes said programmable computer processor to set a maximum deviation $D_{MAX}$;

computer readable program code which causes said programmable computer processor to compare each $D_i$ to $D_{MAX}$; and computer readable program code which causes said programmable computer processor to set each $WF_i$ to 0 where $D_i$ is greater than or equal to $D_{MAX}$.

25. The computer program product of claim 23, further comprising computer readable program code which causes said programmable computer processor to receive a request from a host computer to read and/or write said information.

26. The computer program product of claim 23, further comprising:

computer readable program code which causes said programmable computer processor to storing at a first time said (N) target PES signals; and computer readable program code which causes said programmable computer processor to providing at a second time said (N) target PES signals.

27. The computer program product of claim 23, further comprising computer readable program code which causes said programmable computer processor to calculate said (N) target PES signals for each of one or more index positions offset laterally from each of said (N) servo edges.

28. The computer program product of claim 27, further comprising computer readable program code which causes said programmable computer processor to selecting one of said one or more index positions.

29. The computer program product of claim 23, further comprising:

computer readable program code which causes said programmable computer processor to rank said (N) measured PES(i) Signals based upon the values of D(i) to form (N) Ranked PES(j) signals, wherein the measured PES(i) having the minimum D(i) is set to Ranked PES(1), and wherein the measured PES(i) having the maximum D(i) is set to Ranked PES(N);

computer readable program code which causes said programmable computer processor to assign a Weight Factor WF(j) for each of said Ranked PES(j) signals, wherein $$WF(j) = (N) + 1 - (j)$$

and wherein (j) is an integer greater than or equal to 1 and less than or equal to (N);

computer readable program code which causes said programmable computer processor to determine (N) weighted PES(j) values, wherein $$\text{Weighted } PES(j) = \text{Ranked } PES(j) * WF(j)$$

and wherein (j) is an integer greater than or equal to 1 and less than or equal to (N);

computer readable program code which causes said programmable computer processor to add said (N) weighted PES(j) values to form a Total Weighted PES Value; and computer readable program code which causes said programmable computer processor to form a Composite PES signal by dividing said Total Weighted PES Value by Σ(N).

30. The computer program product of claim 23, further comprising:

computer readable program code which causes said programmable computer processor to setting the minimum $D_i$ equal to $D_{iMIN}$;

computer readable program code which causes said programmable computer processor to determining the (i)th difference factor DF, wherein $DF_i$ is determined using the equation $$DF_i=[(D_i-D_{iMIN})/(D_i+D_{iMIN})]^n$$

wherein i is an integer greater than or equal to 1 and less than or equal to (N), and wherein n is greater than or equal to 1 and less than or equal to about 4.

31. The computer program product of claim 30, further comprising computer readable program code which causes said programmable computer processor to set $WF_i$ equal to $1-DF_i$.

32. A computer program product usable with a programmable computer processor having computer readable program code embodied therein to read and/or write information from and/or to a moving magnetic tape using a tape head disposed adjacent said magnetic tape, wherein said tape head includes (N) servo sensors and wherein said magnetic tape includes (N) servo edges, each servo edge comprising an interface between a first recorded signal and a second recorded signal, wherein each of said (N) servo sensors detects said first recorded signal and said second recorded signal, comprising:

computer readable program code which causes said programmable computer processor to calculate (N) target PES signals, wherein the (i)th target PES signal is determined for the (i)th servo sensor, and wherein (i) is an integer greater than or equal to 1 and less than or equal to (N);

computer readable program code which causes said programmable computer processor to provide (N) measured PES signals, wherein the (i)th servo sensor provides the (i)th measured PES signal;

computer readable program code which causes said programmable computer processor to determine (N) deviations, wherein $D_i$ comprises the absolute magnitude of the difference between the (i)th measured PES signal and the (i)th target PES signal;

computer readable program code which causes said programmable computer processor to rank said (N) measured PES(i) Signals in increasing order based upon the values of D(i) to form (N) Ranked PES(j) signals, wherein the measured PES(i) having the minimum D(i) is set to Ranked PES(1), and wherein the measured PES(i) having the maximum D(i) is set to Ranked PES(N);

computer readable program code which causes said programmable computer processor to assign a Weight Factor WF(j) for each of said Ranked PES(j) signals, wherein $$WF(j)=(N)+1-(j)$$

and wherein (j) is an integer greater than or equal to 1 and less than or equal to (N);

computer readable program code which causes said programmable computer processor to determine (N) weighted PES(j) values, wherein Weighted $PES(j)$=Ranked $PES(j)*WF(j)$ and wherein (j) is an integer greater than or equal to 1 and less than or equal to (N);

computer readable program code which causes said programmable computer processor to add said (N) weighted PES(j) values to form a Total Weighted PES Value; and computer readable program code which causes said programmable computer processor to form a Composite PES signal by dividing said Total Weighted PES Value by Σ(N); and computer readable program code which causes said programmable computer processor to position said tape head using said Composite PES signal.

33. A computer program product usable with a programmable computer processor having computer readable program code embodied therein to read and/or write information from and/or to a moving magnetic tape using a tape head disposed adjacent said magnetic tape, wherein said tape head includes (N) servo sensors and wherein said magnetic tape includes (N) servo edges, each servo edge comprising an interface between a first recorded signal and a second recorded signal, wherein each of said (N) servo sensors detects said first recorded signal and said second recorded signal, comprising:

computer readable program code which causes said programmable computer processor to calculate (N) target PES signals, wherein the (i)th target PES signal is determined for the (i)th servo sensor, and wherein (i) is an integer greater than or equal to 1 and less than or equal to (N);

computer readable program code which causes said programmable computer processor to provide (N) measured PES signals, wherein the (i)th servo sensor provides the (i)th measured PES signal;

determine (N) deviations, wherein $D_i$ comprises the absolute magnitude of the difference between the (i)th measured PES signal and the (i)th target PES signal;

computer readable program code which causes said programmable computer processor to set the minimum $D_i$ equal to $D_{iMIN}$;

computer readable program code which causes said programmable computer processor to determine the (i)th difference factor DF, wherein $DF_i$ is determined using the equation $$DF_i=[(D_i-D_{iMIN})/(D_i+D_{iMIN})]^n$$

wherein i is an integer greater than or equal to 1 and less than or equal to (N), and wherein n is 1;

computer readable program code which causes said programmable computer processor to set $WF_i$ equal to $1-DF_i$;

computer readable program code which causes said programmable computer processor to set a maximum deviation $D_{MAX}$;

computer readable program code which causes said programmable computer processor to compare each $D_i$ to $D_{MAX}$;

computer readable program code which causes said programmable computer processor to set each $WF_i$ to 0 where $D_i$ is greater than or equal to $D_{MAX}$;

computer readable program code which causes said programmable computer processor to form (N) weighted PES signals, wherein the (i)th weighted PES signal is formed by multiplying the (i)th weight factor times the (i)th measured PES signal;

computer readable program code which causes said programmable computer processor to average said (N) weighted PES signals to form a Composite PES signal;

computer readable program code which causes said programmable computer processor to position said tape head using said Composite PES signal.

34. A tape drive for reading and/or writing information to a magnetic tape, wherein said magnetic tape comprises at least one or more continuous servo edges comprising an interface between a first recorded signal and a second recorded signal, comprising:

a motion system capable of moving said magnetic tape alternatingly in a first direction and an opposing second direction along a first axis;

a tape head capable of moving alternatingly in a third direction and an opposing fourth direction along a second axis, wherein said first axis and said second axis are substantially orthogonal, one or more servo sensors disposed on said tape head, wherein each of said one or more servo sensors are capable of detecting said first recorded signal and said second recorded signal;

a servo detector, wherein said servo detector is capable of communication with each of said one or more servo sensors;

an independent position sensor, wherein said independent position sensor provides an IPS signal comprising a measurement of the lateral position of said tape head with respect to the tape path;

a servo loop, wherein said servo loop is capable of moving said tape head in said third direction and in said fourth direction;

logic, wherein said logic is capable of communicating with said servo detector, said independent position sensor, and said servo loop, said logic:

determining (N) target PES signals, wherein the (i)th target PES signal is determined for the (i)th servo sensor, and wherein (i) is an integer greater than or equal to 1 and less than or equal to (N);

providing (N) measured PES signals, wherein the (i)th servo sensor provides the (i)th measured PES signal;

calculating (N) deviations, wherein $D_i$ comprises the absolute magnitude of the difference between the (i)th measured PES signal and the (i)th target PES signal;

assigning (N) Weight Factors, wherein $WF_i$ comprises the assigned Weight Factor for the (i)th measured PES signal, and wherein $WF_i$ is inversely proportional to $D_i$;

forming (N) weighted PES signals, wherein the (i)th weighted PES signal is formed by multiplying the (i)th Weight Factor times the (i)th measured PES signal;

computing a Composite PES signal using said (N) weighted PES signals; and positioning said tape head using said Composite PES signal.

35. The tape drive of claim 34, said logic:

setting a maximum deviation $D_{MAX}$;

comparing each $D_i$ to $D_{MAX}$; and setting each $WF_i$ to 0 where $D_i$ is greater than or equal to $D_{MAX}$.

36. The tape drive of claim 34, said logic receiving a request from a host computer to read and/or write said information.

37. The tape drive of claim 34, said logic:

storing at a first time said (N) target PES signals; and providing at a second time said (N) target PES signals.

38. The tape drive of claim 34, said logic determining said (N) target PES signals for each of one or more index positions offset laterally from each of said (N) servo edges.

39. The tape drive of claim 38, said logic selecting one of said one or more index positions.

40. The tape drive of claim 34, said logic:

ranking said (N) measured PES(i) Signals based upon the values of D(i) to form (N) Ranked PES(j) signals, wherein the measured PES(i) having the minimum D(i) is set to Ranked PES(1), and wherein the measured PES(i) having the maximum D(i) is set to Ranked PES(N);

assigning a Weight Factor WF(j) for each of said Ranked PES(j) signals, wherein $$WF(j)=(N)+1-(j)$$

and wherein (j) is an integer greater than or equal to 1 and less than or equal to (N);

determining (N) weighted PES(j) values, wherein $$\text{Weighted } PES(j)=\text{Ranked } PES(j)*WF(j)$$

and wherein (j) is an integer greater than or equal to 1 and less than or equal to (N);

adding said (N) weighted PES(j) values to form a Total Weighted PES Value; and forming a Composite PES signal by dividing said Total Weighted PES Value by $\Sigma E(N)$.

41. The tape drive of claim 34, said logic:

setting the minimum $D_i$ equal to $D_{iMIN}$;

determining the (i)th difference factor $DF_i$ wherein $DF_i$ is determined using the equation $$DF_i=[(D_i-D_{iMIN})/(D_i+D_{iMIN})]^n$$

wherein i is an integer greater than or equal to 1 and less than or equal to (N), and wherein n is greater than or equal to 1 and less than or equal to about 4.

42. The tape drive of claim 41, said logic setting $WF_i$ equal to $1-DF_i$.

43. A tape drive for reading and/or writing information to a magnetic tape, wherein said magnetic tape comprises at least one or more continuous servo edges comprising an interface between a first recorded signal and a second recorded signal, comprising:

a motion system capable of moving said magnetic tape alternatingly in a first direction and an opposing second direction along a first axis;

a tape head capable of moving alternatingly in a third direction and an opposing fourth direction along a second axis, wherein said first axis and said second axis are substantially orthogonal, one or more servo sensors disposed on said tape head, wherein each of said one or more servo sensors are capable of detecting said first recorded signal and said second recorded signal;

a servo detector, wherein said servo detector is capable of communication with each of said one or more servo sensors;

an independent position sensor, wherein said independent position sensor provides an IPS signal comprising a measurement of the lateral position of said tape head with respect to the tape path;

a servo loop, wherein said servo loop is capable of moving said tape head in said third direction and in said fourth direction;

logic, wherein said logic is capable of communicating with said servo detector, said independent position sensor, and said servo loop, said logic:

determining (N) target PES signals, wherein the (i)th target PES signal is determined for the (i)th servo sensor, and wherein (i) is an integer greater than or equal to 1 and less than or equal to (N);

providing (N) measured PES signals, wherein the (i)th servo sensor provides the (i)th measured PES signal;

calculating (N) deviations, wherein $D_i$ comprises the absolute magnitude of the difference between the (i)th measured PES signal and the (i)th target PES signal;

ranking said (N) measured PES(i) Signals in increasing order based upon the values of D(i) to form (N) Ranked PES(j) signals, wherein the measured PES(i) having the minimum D(i) is set to Ranked PES(1), and wherein the measured PES(i) having the maximum D(i) is set to Ranked PES(N);

assigning a Weight Factor WF(j) for each of said Ranked PES(j) signals, wherein $WF(j)=(N)+1-(j)$ and wherein (j) is an integer greater than or equal to 1 and less than or equal to (N);

determining (N) weighted PES(j) values, wherein

Weighted $PES(j)$=Ranked $PES(j)*WF(j)$ and wherein (j) is an integer greater than or equal to 1 and less than or equal to (N);

adding said (N) weighted PES(j) values to form a Total Weighted PES Value; and forming a Composite PES signal by dividing said Total Weighted PES Value by $\Sigma(N)$; and positioning said tape head using said Composite PES signal.

44. A tape drive for reading and/or writing information to a magnetic tape, wherein said magnetic tape comprises at least one or more continuous servo edges comprising an interface between a first recorded signal and a second recorded signal, comprising:

a motion system capable of moving said magnetic tape alternatingly in a first direction and an opposing second direction along a first axis;

a tape head capable of moving alternatingly in a third direction and an opposing fourth direction along a second axis, wherein said first axis and said second axis are substantially orthogonal, one or more servo sensors disposed on said tape head, wherein each of said one or more servo sensors are capable of detecting said first recorded signal and said second recorded signal;

a servo detector, wherein said servo detector is capable of communication with each of said one or more servo sensors;

an independent position sensor, wherein said independent position sensor provides an IPS signal comprising a measurement of the lateral position of said tape head with respect to the tape path;

a servo loop, wherein said servo loop is capable of moving said tape head in said third direction and in said fourth direction;

logic, wherein said logic is capable of communicating with said servo detector, said independent position sensor, and said servo loop, said logic:

determining (N) target PES signals, wherein the (i)th target PES signal is determined for the (i)th servo sensor, and wherein (i) is an integer greater than or equal to 1 and less than or equal to (N);

providing (N) measured PES signals, wherein the (i)th servo sensor provides the (i)th measured PES signal;

calculating (N) deviations, wherein $D_i$ comprises the absolute magnitude of the difference between the (i)th measured PES signal and the (i)th target PES signal;

setting the minimum $D_i$ equal to $D_{iMIN}$;

determining the (i)th difference factor DF, wherein $DF_i$ is determined using the equation $DF_i=[(D_i-D_{iMIN})/(D_i+D_{iMIN})]^n$ wherein i is an integer greater than or equal to 1 and less than or equal to (N), and wherein n is 1;

setting $WF_i$ equal to $1-DF_i$;

setting a maximum deviation $D_{MAX}$;

comparing each $D_i$ to $D_{MAX}$;

setting each $WF_i$ to 0 where $D_i$ is greater than or equal to $D_{MAX}$;

forming (N) weighted PES signals, wherein the (i)th weighted PES signal is formed by multiplying the (i)th weight factor times the (i)th measured PES signal;

averaging said (N) weighted PES signals to form a Composite PES signal; and positioning said tape head using said Composite PES signal.

* * * * *